United States Patent
Chen et al.

(10) Patent No.: US 8,995,929 B2
(45) Date of Patent: Mar. 31, 2015

(54) METHODS AND APPARATUS FOR WIRELESS OPTIMIZATION BASED ON PLATFORM CONFIGURATION AND USE CASES

(75) Inventors: Camille Chen, Cupertino, CA (US); Christopher B. Zimmermann, Cupertino, CA (US); Hsin-Yao Chen, Cupertino, CA (US); Lei Li, Cupertino, CA (US); Michael Giles, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 566 days.

(21) Appl. No.: 13/312,894

(22) Filed: Dec. 6, 2011

(65) Prior Publication Data

US 2013/0143494 A1  Jun. 6, 2013

(51) Int. Cl.
*H04B 1/00* (2006.01)
*H04B 7/00* (2006.01)
(Continued)

(52) U.S. Cl.
CPC ............... *H04W 8/22* (2013.01); *H04B 7/0691* (2013.01); *H04B 7/0874* (2013.01); *H04L 1/0003* (2013.01); *H04L 1/0009* (2013.01); *H04L 1/0023* (2013.01); *H04W 88/06* (2013.01)
USPC .............. 455/69; 455/68; 455/41.2; 455/522; 370/252

(58) Field of Classification Search
USPC ........... 455/452.1, 452.2, 502, 507, 509, 513, 455/67.11, 67.13, 68–71, 522, 41.2; 370/252, 341, 437, 328, 329, 465, 350
See application file for complete search history.

(56) References Cited

U.S. PATENT DOCUMENTS 6,646,505 B2   11/2003   Anderson et al.
6,774,864 B2   8/2004   Evans et al.
(Continued)

FOREIGN PATENT DOCUMENTS

CN    102 170 664 A    8/2011
EP    1 626 541 A2    2/2006
(Continued)

OTHER PUBLICATIONS

Wi-Fi(IEEE802.11) and Bluetooth Coexistence; Issues and Solutions, by Lior Ophir, Yegal Bitran, Italy Sherman, pp. 847-852, 0-7803-8523-3/04 .COPYRGT.2004 IEEE.
(Continued)

*Primary Examiner* — Tuan A Tran
(74) *Attorney, Agent, or Firm* — Gazdzinski & Associates, PC

(57) ABSTRACT

Methods and apparatus for optimizing wireless network performance by incorporating platform configuration and use case information. In one exemplary scheme, a client device provides the wireless network with an indications of impacted operations based on the client device's platform configuration. The wireless network can adjust the radio link to the client device so as to best accommodate the impacted operation. In one embodiment, a client device that includes a 3×3 Wireless Local Area Network (WLAN) (or 4×4, 2×2, etc.) and Bluetooth (BT) module identifies a subset of modulation and coding schemes (MCS) that are preferred for operation. The client device provides the identified subset to the WLAN access point (AP). Responsively, the WLAN AP selects a MCS, such that the client device's overall performance remains at an acceptable level. In another embodiment, the server/client can adjust MCS and/or active antenna chains based on the noise floor (NF) level.

20 Claims, 12 Drawing Sheets

(51) Int. Cl.
*H04B 7/06* (2006.01)
*H04B 7/08* (2006.01)
*H04L 1/00* (2006.01)
*H04W 8/22* (2009.01)
*H04W 88/06* (2009.01)

(56) References Cited

U.S. PATENT DOCUMENTS

| | | |
|---|---|---|
| 6,978,121 B1 | 12/2005 | Lane |
| 7,142,864 B2 | 11/2006 | Laroia et al. |
| 7,146,133 B2 | 12/2006 | Bahl et al. |
| 7,181,182 B2 | 2/2007 | Cha et al. |
| 7,200,376 B2 | 4/2007 | Cha et al. |
| 7,224,704 B2 | 5/2007 | Lu et al. |
| 7,253,783 B2 | 8/2007 | Chiang et al. |
| 7,295,860 B2 | 11/2007 | Suwa |
| 7,301,924 B1 | 11/2007 | Gurbuz et al. |
| 7,352,332 B1 | 4/2008 | Betts-LaCroix et al. |
| 7,352,688 B1 | 4/2008 | Peralha et al. |
| 7,359,730 B2 | 4/2008 | Dennis et al. |
| 7,362,275 B2 | 4/2008 | Tu et al. |
| 7,366,244 B2 | 4/2008 | Gebara et al. |
| 7,444,119 B2 | 10/2008 | Bekritsky |
| 7,505,790 B2 | 3/2009 | Chang et al. |
| 7,546,142 B2 | 6/2009 | Ginzburg et al. |
| 7,561,904 B2 | 7/2009 | Lagnado |
| 7,574,179 B2 | 8/2009 | Barak et al. |
| 7,606,553 B2 | 10/2009 | Konaka |
| 7,640,373 B2 * | 12/2009 | Cudak et al. ............ 710/19 |
| 7,657,411 B2 | 2/2010 | Poetsch et al. |
| 7,701,913 B2 | 4/2010 | Chen et al. |
| 7,760,679 B2 * | 7/2010 | Baker et al. ............ 370/318 |
| 7,813,295 B2 | 10/2010 | Trachewsky |
| 7,813,314 B2 | 10/2010 | Fulknier et al. |
| 7,949,364 B2 | 5/2011 | Kasslin et al. |
| 8,072,914 B2 | 12/2011 | Brisebois et al. |
| 8,121,072 B2 * | 2/2012 | Awad et al. ............ 370/328 |
| 8,200,161 B2 | 6/2012 | Walley et al. |
| 8,265,017 B2 | 9/2012 | Robinson et al. |
| 8,270,500 B2 * | 9/2012 | Tidestav ............ 375/259 |
| 8,284,721 B2 | 10/2012 | Chen et al. |
| 8,284,725 B2 * | 10/2012 | Ahmadi ............ 370/329 |
| 8,340,578 B2 | 12/2012 | Tolentino et al. |
| 8,379,548 B1 | 2/2013 | Husted |
| 8,396,003 B2 | 3/2013 | Leinonen et al. |
| 8,594,049 B2 * | 11/2013 | Ohta ............ 370/332 |
| 8,665,781 B2 * | 3/2014 | Awad et al. ............ 370/328 |
| 2002/0173272 A1 | 11/2002 | Liang et al. |
| 2005/0141895 A1 | 6/2005 | Ruiz |
| 2005/0170776 A1 | 8/2005 | Siorpaes |
| 2005/0208900 A1 | 9/2005 | Karacaoglu |
| 2005/0215197 A1 | 9/2005 | Chen et al. |
| 2005/0239497 A1 | 10/2005 | Bahl et al. |
| 2005/0276241 A1 | 12/2005 | Kamerman et al. |
| 2006/0005058 A1 | 1/2006 | Chen et al. |
| 2006/0030265 A1 | 2/2006 | Desai et al. |
| 2006/0030266 A1 | 2/2006 | Desai et al. |
| 2006/0034217 A1 | 2/2006 | Kwon et al. |
| 2006/0035653 A1 | 2/2006 | Karaoguz et al. |
| 2006/0084383 A1 | 4/2006 | Ibrahim et al. |
| 2006/0094364 A1 | 5/2006 | Hirota et al. |
| 2006/0133259 A1 | 6/2006 | Lin et al. |
| 2006/0209763 A1 | 9/2006 | Emeott et al. |
| 2006/0223450 A1 | 10/2006 | Dacosta |
| 2006/0274704 A1 | 12/2006 | Desai et al. |
| 2006/0292986 A1 | 12/2006 | Bitran et al. |
| 2006/0292987 A1 | 12/2006 | Ophir et al. |
| 2007/0060055 A1 | 3/2007 | Desai et al. |
| 2007/0066227 A1 | 3/2007 | Duerdodt et al. |
| 2007/0076649 A1 | 4/2007 | Lin et al. |
| 2007/0099567 A1 | 5/2007 | Chen et al. |
| 2007/0109973 A1 | 5/2007 | Trachewsky |
| 2007/0161352 A1 | 7/2007 | Dobrowski et al. |
| 2007/0224936 A1 | 9/2007 | Desai |
| 2007/0232358 A1 | 10/2007 | Sherman |
| 2007/0238483 A1 | 10/2007 | Boireau et al. |
| 2008/0026718 A1 | 1/2008 | Wangard et al. |
| 2008/0069063 A1 | 3/2008 | Li et al. |
| 2008/0080455 A1 | 4/2008 | Rofougaran |
| 2008/0089690 A1 | 4/2008 | Ruiz |
| 2008/0095263 A1 | 4/2008 | Xu et al. |
| 2008/0108394 A1 | 5/2008 | Davis et al. |
| 2008/0125047 A1 | 5/2008 | Li et al. |
| 2008/0192806 A1 | 8/2008 | Wyper et al. |
| 2008/0200124 A1 | 8/2008 | Capretta et al. |
| 2009/0176454 A1 | 7/2009 | Chen et al. |
| 2009/0257379 A1 | 10/2009 | Robinson et al. |
| 2009/0285167 A1 | 11/2009 | Hirsch et al. |
| 2010/0034381 A1 | 2/2010 | Trace et al. |
| 2010/0113090 A1 | 5/2010 | Lin et al. |
| 2010/0153395 A1 | 6/2010 | Hannuksela et al. |
| 2010/0254335 A1 | 10/2010 | Ho et al. |
| 2011/0019561 A1 | 1/2011 | Yun et al. |
| 2011/0081858 A1 | 4/2011 | Tolentino et al. |
| 2011/0090982 A1 | 4/2011 | Chen et al. |

FOREIGN PATENT DOCUMENTS

| | | |
|---|---|---|
| EP | 1 653 672 | 5/2006 |
| EP | 1 838 040 | 9/2007 |
| EP | 1 906 555 | 4/2008 |
| EP | 2244509 | 10/2010 |
| JP | 2004032462 | 1/2004 |
| WO | WO 2008001272 | 1/2008 |
| WO | WO 2008/034038 | 3/2008 |
| WO | WO 2008041071 | 4/2008 |
| WO | WO 2009/055714 | 4/2009 |
| WO | WO 2011/028481 A2 | 3/2011 |
| WO | WO 2011/123550 A1 | 10/2011 |

OTHER PUBLICATIONS

Coexistence Mechanisms for Interference Mitigation Between IEEE 802.11 WLANS and Bluetooth, by Carla F. Chiasserini and Ramesh R. Rao, IEEE Infocom 2002, pp. 590-598, 0-7-803-7476-2/02/.COPYRGT.2002 IEEE.
Bluetooth Core Specification v2.1 + EDR, dated Jul. 26, 2007.
Bluetooth Advanced Audio Distribution Profile 1.2, dated Apr. 16, 2007.
Bluetooth Audio/Video Remote Control Profile 1.3, dated Apr. 16, 2007.
Bluetooth Basic Imaging Profile (BIP), dated Jul. 25, 2003.
Bluetooth Basic Printing Profile (BPP) 1.2, dated Apr. 27, 2006.
Bluetooth Cordless Telephony Profile (CTP), dated Feb. 22, 2001.
Bluetooth Device Identification Profile (DI) 1.3, dated Jul. 26, 2007.

* cited by examiner

METHODS AND APPARATUS FOR WIRELESS OPTIMIZATION BASED ON PLATFORM CONFIGURATION AND USE CASES

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computerized devices and wireless networking. More particularly, in one exemplary aspect, the present invention is directed to optimizing wireless network interfaces based on platform configuration.

2. Description of Related Technology

The growing market for so-called "convergence products" has led to a revolution in the way consumers view computerized devices. These next generation computerized devices focus on offering consumers a substantially unified solution for a variety of services to which consumers have become accustomed. Common examples of such convergence products include, but are not limited to laptop computers, smartphones, and tablet computers such as the exemplary Macbook™, Macbook Pro™, Macbook Air™, iPhone™, and iPad™ manufactured by the Assignee hereof. Convergence products must generally support a variety of wireless protocols and other functions. For instance, a convergence smartphone such as the iPhone has the capability of, among other things, sending and receiving mails over a Wireless Local Area Network (WLAN) such as e.g., the IEEE 802.11a/b/g/n standards, making and receiving voice/data calls using a cellular network (e.g., Global System for Mobile Communications (GSM), Universal Mobile Telecommunications System (UMTS), LTE or LTE-A, etc.) and operating wireless peripheral equipment (such as wireless headsets, keyboards, etc.) using a personal area network (PAN) (e.g., Bluetooth™ protocol (BT), etc.).

Within this context, aggressive form factor designs and new design paradigms have greatly altered the landscape of consumer electronics. Consumers demand design qualities that transcend functionality; certain qualities such as reduced size, aesthetic appeal, portability, shared resources (e.g., multi-purposed components), and battery life have taken precedence over traditional design criteria. For example, metallic construction is highly desired; however, those of ordinary skill will recognize that metallic materials can shield and/or interfere with radio reception. Similarly, compressing multiple radio transceivers within aggressively compact form factors contributes significantly to overall platform noise.

As devices have evolved according to customer preferences, certain design tradeoffs have adversely affected performance. Lower performance can potentially result in a poor user experience with the device. For example, certain aggressive form factors implement both BT and WLAN transceivers/antennae within very close physical proximity to one another. Unfortunately, BT and WLAN share the same ISM (Industrial Scientific Medical) radio band; i.e., 2.4-2.48 GHz frequency range. Consequently, BT and WLAN technologies will often interfere with each other when operating simultaneously, which causes noticeable problems in the user interface (e.g., BT audio stutter and drop-outs, slow WLAN transfer speeds, poor BT mouse tracking, keyboard and touchpad performance, or "jerkiness", etc.).

Current and future consumer electronics device manufacturers must re-evaluate existing design assumptions. Future designs will need to establish new schemes for handling aggressive form factor designs and new design paradigms. In particular, new constraints (such as size and layout, manufacturing and design cost, product schedules, etc.) must be balanced against demands for high performance processors, memories, interfaces, system buses, display elements, and high rate clocking, etc. Realistically, future devices will have to tolerate higher platform noise (e.g., both static and dynamic noise floors (NF)) while still delivering acceptable performance and user experience.

One such design/operational area that may be considered is wireless network operation. Wireless adaptation schemes are generally based on the assumption that the overall network capability is primarily limited by the reception quality of the wireless channel. Generally, it is assumed that low error rates are indicative of low-noise radio environments. Higher order modulation schemes can offer very high data rates, but require low noise radio environments. Consequently, higher order modulation schemes are only enabled within low noise environments. In fact, existing solutions automatically revert to lower order modulation schemes when error rates increase (the increasing error rate is assumed to be a result of radio channel deterioration due to e.g., noise). Unfortunately, since the main contributory cause of error rates in aggressive form factor designs may be unrelated to the actual radio channel, blindly reducing the modulation scheme is a suboptimal solution.

Accordingly, improved solutions are needed for optimizing wireless network operation based on device considerations, in addition to (or in place of) wireless channel conditions.

SUMMARY OF THE INVENTION

The present invention satisfies the aforementioned needs by providing improved apparatus and methods for optimizing wireless network interfaces based on platform configuration.

In one aspect, a method for optimizing wireless network performance is disclosed. In one exemplary embodiment, the method includes: identifying a platform configuration that impacts one or more operations of a client device; notifying a serving device of the platform configuration, where responsive to notification the serving device selects an appropriate setting; and configuring the client device according to the selected appropriate setting. In one such variant, the client device comprises a Wireless Local Area Network (WLAN) interface and a Bluetooth (BT) interface, the WLAN interface and BT interface having at least one shared antenna; the platform configuration comprises concurrent operation of the WLAN and BT interfaces; and the notifying of the platform configuration further comprises indicating one or more modulation and coding schemes (MCS) which exclude the at least one shared antenna.

In a first embodiment, the client device comprises at least a first and second wireless interface. In one such variant, concurrent operation of the first and second wireless interface affect operation of at least the first wireless interface. In another variant, the first interface comprises a plurality of antennas, at least one of the antennas being shared with the second interface.

In a second embodiment, the act of notifying the serving device comprises transmitting a message, the message comprising a listing of one or more preferred settings. In one variant, the listing of one or more preferred settings comprises a listing of one or more modulation and coding schemes (MCS).

In a third embodiment, the act of notifying the serving device comprises transmitting a message, the message comprising a listing of one or more settings that are not preferred.

In a second aspect of the present invention, a client device configured to assist in optimizing wireless network performance is disclosed. In one exemplary embodiment, the client device comprises: a first interface configured to operate within a first wireless network according to a setting; a processor; a computer readable medium, the computer readable medium comprising instructions which when executed by the processor: identify a platform configuration that impacts one or more operations of a client device; notify a serving device of the platform configuration, where responsive to notification the serving device selects an appropriate setting; and configure the first interface according to the selected appropriate setting.

In a first embodiment, the client device additionally comprises a second wireless interface. In one such variant, the first interface comprises a Wireless Local Area Network (WLAN) interface and the second interface comprises a Bluetooth (BT) interface, the WLAN interface and BT interface having at least one shared component. In a second variant, concurrent operation of the first and second wireless interface affect operation of at least the first wireless interface. In a third variant, the first interface comprises a plurality of antennas, at least one of the antennas being shared with the second interface.

In a second embodiment, the client device further comprises instructions which when executed by the processor: monitor one or more platform configurations; and determine one or more preferred settings based at least in part on the one or more impacted operations. In one variant, the one or more preferred settings comprises at least a modulation scheme. In another variant, the one or more preferred settings comprises at least a coding scheme.

In a third embodiment, a server device configured to optimize wireless network performance based on client device platform information is disclosed. In one exemplary embodiment, the server device comprises: a first interface configured to serve a first wireless network; a processor; a computer readable medium, the computer readable medium comprising instructions which when executed by the processor: receive a platform configuration information from at least one client device; select an appropriate setting based at least in part on the received platform configuration information; and configure the first wireless network according to the selected appropriate setting.

In one embodiment, the first interface comprises a Wireless Local Area Network (WLAN) interface.

In a second embodiment, the platform configuration information comprises one or more preferred modulation and coding schemes (MCS).

In a third embodiment, the server device further comprises instructions which when executed by the processor update an internal database with the platform configuration information, where the internal database comprises platform configuration information associated with a plurality of client devices.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
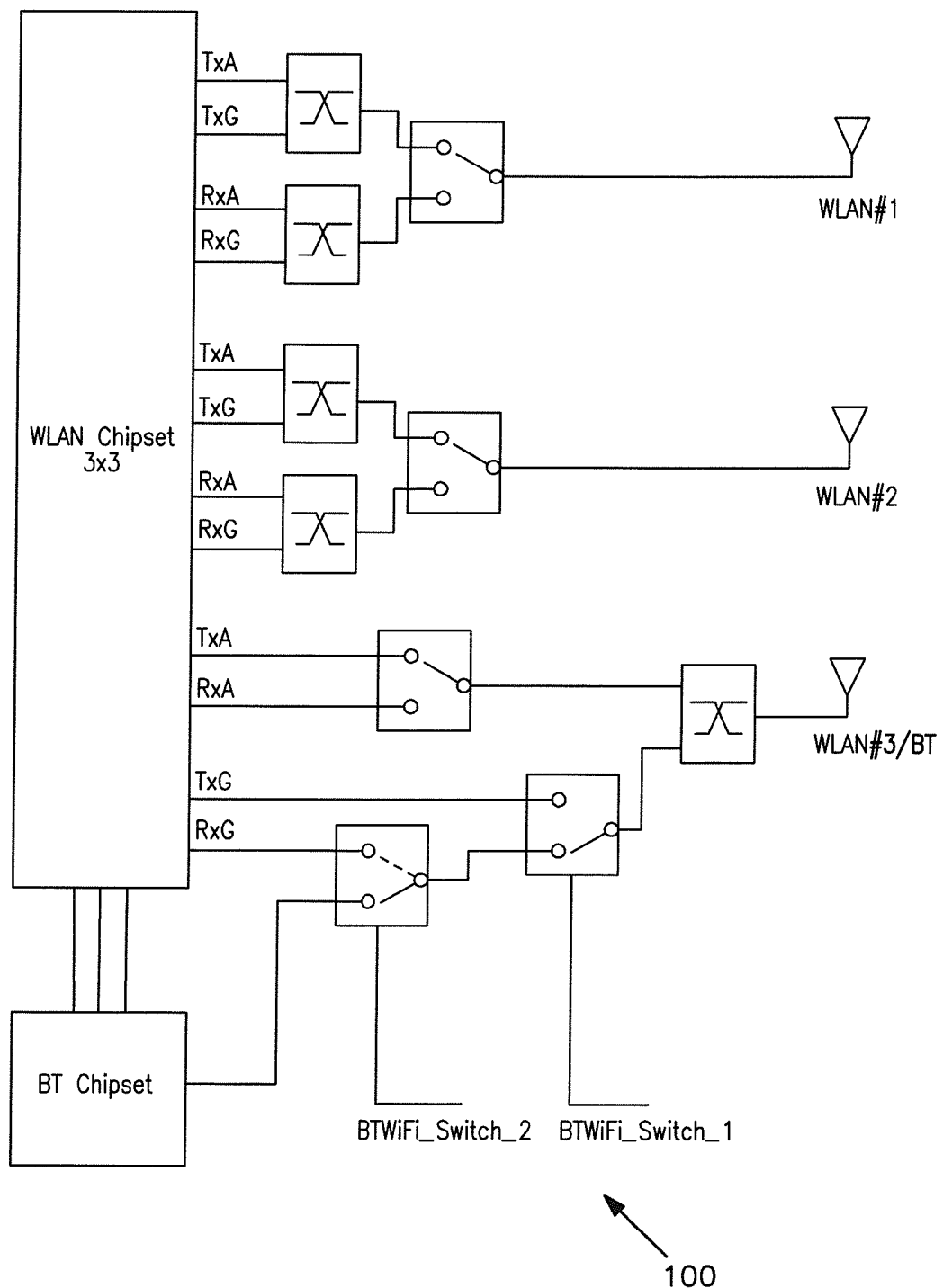
FIG. 1 is a block diagram of one prior art implementation of a Wireless Local Area Network (WLAN) Bluetooth (BT) capable client device.

Reference is now made to the drawings, wherein like numerals refer to like parts throughout.

Overview

As previously noted, the main contributory cause of performance degradation in aggressive form factor designs may be partly or even wholly unrelated to the actual radio channel conditions. In one aspect of the present invention, wireless network performance can be optimized by incorporating platform configuration information. For example, in one exemplary scheme, a client device provides the wireless network with an indication of "impacted" operations based on the client device's platform configuration. Responsively, the wireless network can adjust the radio link to the client device so as to best accommodate the impacted operation. Unlike prior art solutions, various embodiments of the present invention consider factors other than radio link performance in determining appropriate radio link configuration. Specifically, by providing client device platform information to the wireless network, the network can optimize performance in an intelligent manner.

In one exemplary embodiment, a client device is considered that includes a 3×3 Wireless Local Area Network (WLAN) and Bluetooth (BT) combination module, which can experience significant performance loss while operating in certain configurations. During such problematic operation, the client device determines its platform configuration, and identifies a subset of modulation and coding schemes (MCS) that are available. The client device provides the identified subset to the WLAN access point (AP). Responsively, the WLAN AP selects a MCS, such that the client device's overall performance remains at an acceptable level. For example, rather than dropping the client device to the lowest MCS (and hence lowering data rate), the WLAN AP can select an intermediate MCS that is not affected (or is less affected) by the client device's platform configuration.

In one variant of the invention, a client device characterizes its noise floor on a per-chain, per-channel, and/or per-use case basis, etc. This characterization information can be performed during the manufacture of the client device, by third-party service technicians, and/or by the device itself at execution time. Significant performance gains can be made by adjusting MCS selection logic to compensate for antenna performance, based on the characterization information. Moreover, since signal-to-noise ratio (SNR) is more useful than received signal strength index (RSSI) alone, a client device can significantly improve performance by calculating SNR based on both RSSI and NF (e.g., per-antenna, per-channel, per-use case, etc.).

DETAILED DESCRIPTION OF EXEMPLARY EMBODIMENTS

Exemplary embodiments of the present invention are now described in detail. While these embodiments are primarily discussed in the context of a device having both Wi-Fi and Bluetooth wireless interfaces, the general principles and advantages of the invention may be extended to other types of wireless devices that experience significant noise that is not contributed by or related to the wireless channel, the following therefore being merely exemplary in nature.

For example, those of ordinary skill in the related arts will recognize that various aspects of the present invention are widely applicable to other wireless technologies, especially those that are typically packaged with other interference-generating components (e.g., digital components such as a central processing unit (CPU), graphics processor (GFX), memory components, hard disk drives (HDD), liquid crystal displays (LCDs), other wireless interfaces, etc.). Such applications include for example, cellular applications, wireless personal media devices, and the like.

Prior Art Operation—

Existing consumer electronics implement 3×3 Multiple Input Multiple Output (MIMO) operation; i.e., three (3) transmit antennas and three (3) receive antennas. For example, 3×3 WLAN access points (AP) have been deployed since 2010, whereas 3×3 WLAN client devices (e.g., laptop computers) were deployed in 2011. Exemplary 3×3 systems can theoretically achieve data rate performance that exceeds 200 Mbps with 20 MHz bandwidth, and over 400 Mbps with 40 MHz bandwidth. Moreover, future embodiments may attain even higher performance capabilities e.g., 800 Mbps with 80 MHz bandwidth (such as IEEE 802.11 ac). These theoretical data rates are more than adequate for the consumer electronics applications that are currently available. Unfortunately, actual data rates are much lower due to practical limitations, and are heavily influenced by considerations such as distance between the client and server. For example, practical system performance is heavily impacted by certain design constraints (e.g., antenna performance, antenna isolation between WLAN and BT, antenna sharing constraints in the platform, form factor/materials, etc.).

Referring now to FIG. 1, one prior art implementation of a Wireless Local Area Network (WLAN) Bluetooth (BT) capable client device 100 is illustrated. As shown, one (1) antenna is shared between WLAN and BT via a series of switches (WLAN #3/BT). The other two (2) antenna for WLAN (WLAN #1, WLAN #2) have limited isolation to the shared antenna (WLAN #3/BT). During certain operational modes, the WLAN and BT interfaces "time share" the shared antenna. WLAN/BT time sharing algorithms allocate a first portion of time to the BT interface, and a second portion of time to the WLAN interface. While typical BT devices use much lower data rates than the corresponding WLAN interface, the BT interface is typically higher priority, because most BT devices are high-priority user interface type equipment (e.g., BT mouse, BT keyboard, BT headset, etc.) which can directly impact user experience. In fact, if the system of FIG. 1 is connected to several BT devices, then WLAN transmit and receive performance is significantly impacted due to such BT prioritization. In some cases, when WLAN data rates drop below 10 Mbps, many desirable applications can no longer be supported (e.g., High Definition (HD) video streaming, FaceTime™, etc.).

Figure 2:
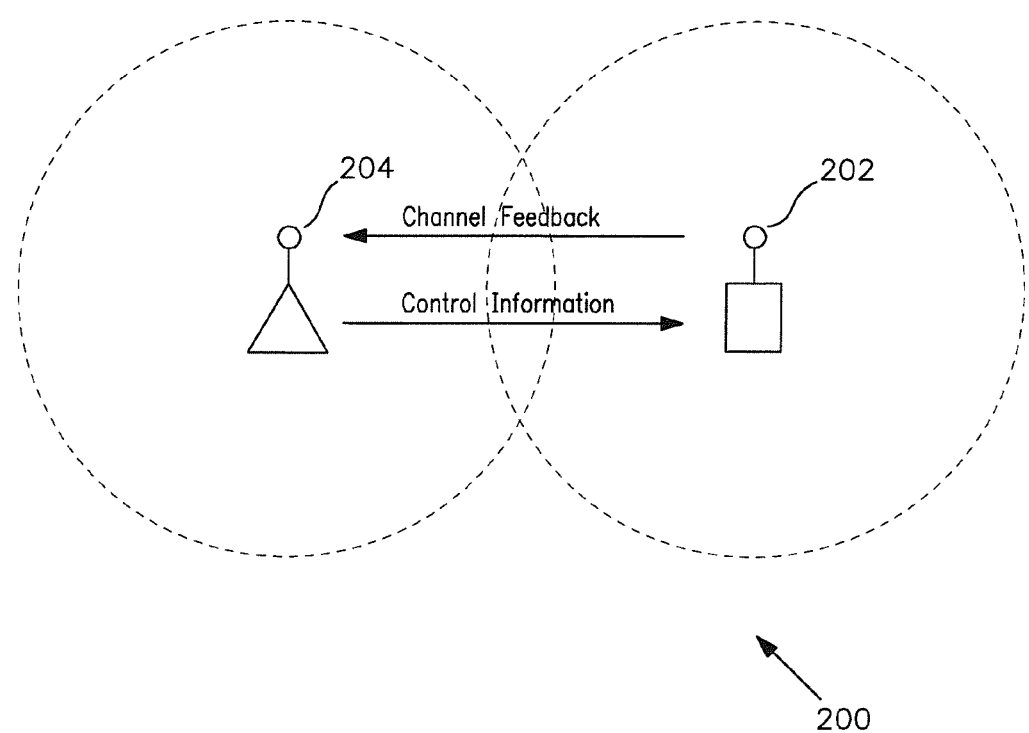
FIG. 2 is a graphical representation of one prior art communication session useful for illustrating various deficiencies of the prior art.

FIG. 2 depicts a typical prior art communication session 200 useful for illustrating various deficiencies of the prior art. As shown, the Wireless Local Area Network (WLAN) client device 202 and WLAN Access Point (AP) 204 have an ongoing communication session during which the client device receives data transmitted by the WLAN AP (communication sessions can be bidirectional; the illustrated scenario has been simplified to a unidirectional transaction for clarity). During normal operation, the transmitting side transmits control information (e.g., rate adaptation and the modulation coding scheme (MCS) for the ongoing transaction). In many implementations, the transmitting AP may receive various channel feedback information from the client device to assist in its MCS decision. Common examples of channel feedback information include: receiver signal strength index, packet error rate (PER), etc.

As a brief aside, within the exemplary context of IEEE 802.11n wireless networks, a predefined set of Modulation and Coding Schemes (MCS) are recognized by IEEE 802.11n-compliant devices; each MCS is uniquely identified by an index value. During operation, a transmitter determines an appropriate MCS and transmits the corresponding index value to the receiver. Responsively, the receiver configures itself according to the index value. TABLE 1 below details extant Modulation and Coding Schemes (MCS) implemented within IEEE 802.11n compliant devices as of the present date.

TABLE 1

| | | | | Data rate (Mbit/s) | | | |
| --- | --- | --- | --- | --- | --- | --- | --- |
| | | | | 20 MHz channel | | 40 MHz channel | |
| | | Modu- | Cod- | | | | |
| MCS | Spatial | lation | ing | 800 ns | 400 ns | 800 ns | 400 ns |
| index | streams | type | rate | GI | GI | GI | GI |
| 0 | 1 | BPSK | 1/2 | 6.50 | 7.20 | 13.50 | 15.00 |
| 1 | 1 | QPSK | 1/2 | 13.00 | 14.40 | 27.00 | 30.00 |
| 2 | 1 | QPSK | 3/4 | 19.50 | 21.70 | 40.50 | 45.00 |
| 3 | 1 | 16-QAM | 1/2 | 26.00 | 28.90 | 54.00 | 60.00 |
| 4 | 1 | 16-QAM | 3/4 | 39.00 | 43.30 | 81.00 | 90.00 |
| 5 | 1 | 64-QAM | 2/3 | 52.00 | 57.80 | 108.00 | 120.00 |
| 6 | 1 | 64-QAM | 3/4 | 58.50 | 65.00 | 121.50 | 135.00 |
| 7 | 1 | 64-QAM | 5/6 | 65.00 | 72.20 | 135.00 | 150.00 |
| 8 | 2 | BPSK | 1/2 | 13.00 | 14.40 | 27.00 | 30.00 |

TABLE 1-continued

| | | | | Data rate (Mbit/s) | | | |
|---|---|---|---|---|---|---|---|
| | | Modu- | Cod- | 20 MHz channel | | 40 MHz channel | |
| MCS index | Spatial streams | lation type | ing rate | 800 ns GI | 400 ns GI | 800 ns GI | 400 ns GI |
| 9 | 2 | QPSK | 1/2 | 26.00 | 28.90 | 54.00 | 60.00 |
| 10 | 2 | QPSK | 3/4 | 39.00 | 43.30 | 81.00 | 90.00 |
| 11 | 2 | 16-QAM | 1/2 | 52.00 | 57.80 | 108.00 | 120.00 |
| 12 | 2 | 16-QAM | 3/4 | 78.00 | 86.70 | 162.00 | 180.00 |
| 13 | 2 | 64-QAM | 2/3 | 104.00 | 115.60 | 216.00 | 240.00 |
| 14 | 2 | 64-QAM | 3/4 | 117.00 | 130.00 | 243.00 | 270.00 |
| 15 | 2 | 64-QAM | 5/6 | 130.00 | 144.40 | 270.00 | 300.00 |
| 16 | 3 | BPSK | 1/2 | 19.50 | 21.70 | 40.50 | 45.00 |
| 17 | 3 | QPSK | 1/2 | 39.00 | 43.30 | 81.00 | 90.00 |
| 18 | 3 | QPSK | 3/4 | 58.50 | 65.00 | 121.50 | 135.00 |
| 19 | 3 | 16-QAM | 1/2 | 78.00 | 86.70 | 162.00 | 180.00 |
| 20 | 3 | 16-QAM | 3/4 | 117.00 | 130.70 | 243.00 | 270.00 |
| 21 | 3 | 64-QAM | 2/3 | 156.00 | 173.30 | 324.00 | 360.00 |
| 22 | 3 | 64-QAM | 3/4 | 175.50 | 195.00 | 364.50 | 405.00 |
| 23 | 3 | 64-QAM | 5/6 | 195.00 | 216.70 | 405.00 | 450.00 |
| 24 | 4 | BPSK | 1/2 | 26.00 | 28.80 | 54.00 | 60.00 |
| 25 | 4 | QPSK | 1/2 | 52.00 | 57.60 | 108.00 | 120.00 |
| 26 | 4 | QPSK | 3/4 | 78.00 | 86.80 | 162.00 | 180.00 |
| 27 | 4 | 16-QAM | 1/2 | 104.00 | 115.60 | 216.00 | 240.00 |
| 28 | 4 | 16-QAM | 3/4 | 156.00 | 173.20 | 324.00 | 360.00 |
| 29 | 4 | 64-QAM | 2/3 | 208.00 | 231.20 | 432.00 | 480.00 |
| 30 | 4 | 64-QAM | 3/4 | 234.00 | 260.00 | 486.00 | 540.00 |
| 31 | 4 | 64-QAM | 5/6 | 260.00 | 288.80 | 540.00 | 600.00 |

For a 3×3 MIMO client, only MCS0 through MCS23 are available (i.e., each antenna can handle a spatial stream, so a 3×3 MIMO system can handle three (3) spatial streams). During intervals of relatively high RSSI (e.g., when the client device and the WLAN AP are very close in spatial proximity), prior art IEEE 802.11n transmitters will increase the MCS complexity to take advantage of the clear channel conditions (e.g., the WLAN AP allocates a 3×3 MCS (e.g., MCS 21 or above utilize 64-QAM which requires a relatively high SNR)). Similarly, when channel quality has significantly degraded, the IEEE 802.11n transmitter switches down to lower, more robust MCS configurations.

Existing schemes for wireless configuration are based on wireless channel conditions, but do not compensate for platform configurations. In particular, in MIMO type devices, the noise floor (NF) will be different for each antenna, due to the location and the design of these antennas. For example, consider the prior art client device of FIG. 1: a client device in communication with a WLAN AP has a relatively clear channel. Responsively, the WLAN AP increases the MCS configuration to incorporate MIMO operation. In use scenarios where the client device has sole control over all of its antennas, higher-order MCS configurations will provide higher data rates. Unfortunately, in this scenario, the client device has time shared at least one of its antennas (WLAN #3/BT) with a Bluetooth (BT) device (e.g., a headset). Additionally, the BT device is further classified as a Synchronous Connection-Oriented (SCO) device. BT SCO devices have a higher priority in the time sharing scheme, thus the antenna is switched preferentially from WLAN to BT. In this example, the BT SCO connection receives one third (1.25 ms out of every 3.75 ms) of the total antenna time; during this time, both BT and WLAN interfaces are active (both BT and WLAN can receive and transmit data at the same time); however, existing switch designs cannot completely isolate WLAN and BT activities; therefore, the shared antenna experiences attenuations that can exceed 20 dB.

Consequently, even though the WLAN AP operates under the assumption that the radio channel can support high performance 3×3 MIMO operation (MCS 21 and higher), only two (2) of the three (3) antennas are actually usable. Almost immediately after the client device changes to the higher performance MCS setting, the received data performance is sharply affected. In fact, the weak performance of the shared antenna will greatly increase the probability of the client device failing to decode received packets. Worse still, if the packet failures exceed acceptable thresholds, then the client device will report a NACK (not acknowledgement) to the WLAN AP, thereby necessitating a retransmission, which further reduces performance.

Existing devices handle poor performance by resetting the MCS setting to the lowest MCS rates (e.g., 1×1 operation). However, as soon as the client device switches to the lowest MCS rate, the shared antenna is no longer in use, and the client device will report clear reception. The WLAN AP will adjust its service for the clear reception; i.e., the WLAN AP will re-attempt higher MCS configurations which will again "fail" unexpectedly. In this example, the WLAN AP and client device repeatedly jump between the highest and lowest order modulation schemes. This unexpected MCS "churn" or dither creates significant confusion for the device hardware and software. Consequently, prior art solutions are currently configured to be either overly conservative, and/or capable of accepting glitchy and unstable data rates, both of which are non-optimal.

Methods—

Figure 3:
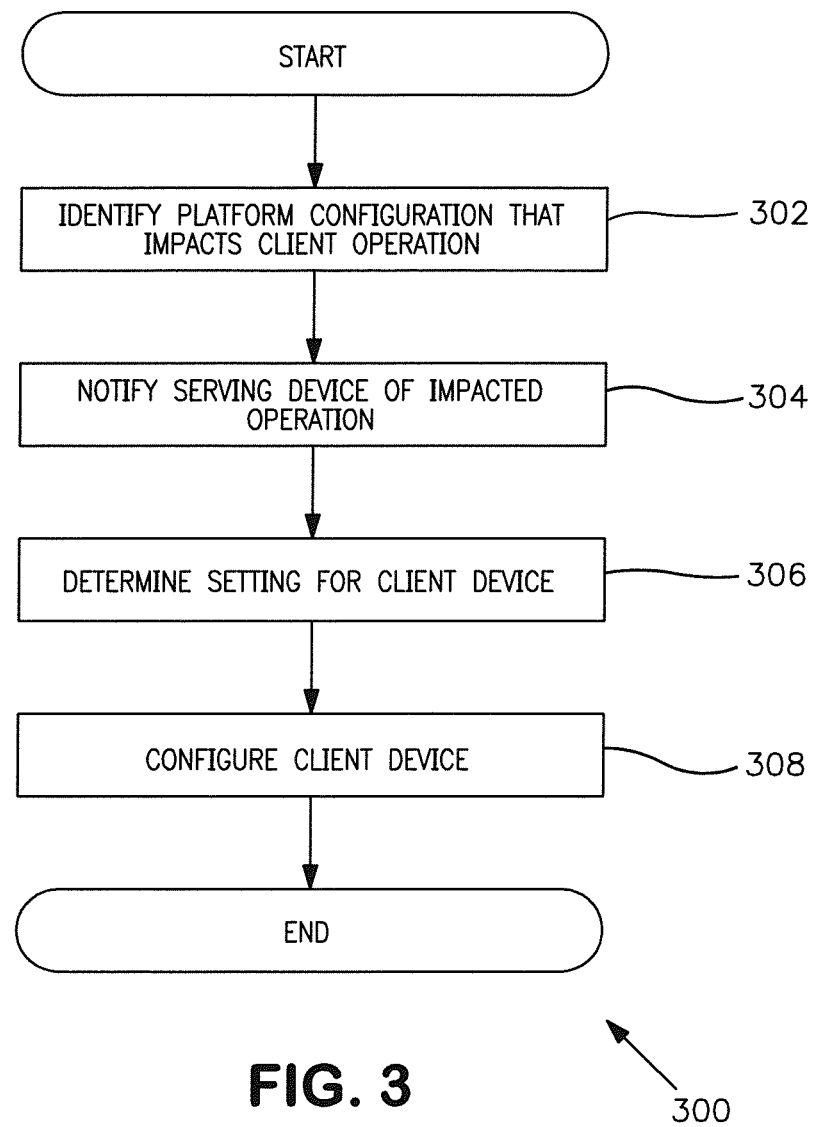
FIG. 3 is a logical flow diagram of one embodiment of a generalized method for optimizing wireless network interfaces based on platform configuration.

FIG. 3 represents one embodiment of a generalized method 300 for optimizing wireless network interfaces based on platform configuration according to the present invention. In one exemplary implementation, the client device provides the wireless network (e.g., WLAN) with indications of impacted operations based on known platform configuration and/or use cases. Responsively, the wireless network manages the radio link to the client device so as to accommodate the impacted operation.

At step 302 of the method 300, a client device identifies one or more platform configurations that affect client device operation. In one embodiment, the client device identifies one or more platform configurations that are especially susceptible to (or which radiate high levels of) electromagnetic interference (EMI). As a brief aside, EMI is typically generated by very fast electrical current transitions; EMI can be intentional (e.g., operation of a wireless interface) or unintentional (e.g., radiated from high speed circuits, leakage due to poor isolation, etc.). Common examples of platform configurations that are likely to experience high levels of EMI include for example: (i) concurrent operation of two distinct wireless interfaces, (ii) high speed processing and data transfer, (iii) user interface operation (certain types of audio visual (A/V) equipment such as displays require high speed switching), (iv) bursts of high current (e.g., a camera flash "strobe", certain types of transmission protocols), etc.

As previously noted, evolutionary consumer devices have driven designs that provide acceptable operation, even in less than optimal configuration. For example, in one exemplary embodiment of the invention described in greater detail herein (see Example Operation), a client device comprises a first wireless (WLAN) interface and a second (BT) interface that share a common antenna. The common antenna reduces the overall device form factor, and satisfies aesthetic design requirements. However, during concurrent operation of the WLAN and BT interfaces, the antenna is time shared between both interfaces; i.e., the antenna is switched between the WLAN and BT interface without the benefit of coordinated multiplexing. While concurrent operation of the WLAN and BT interfaces will adversely affect overall device performance, the other benefits outweigh the performance concerns. However, within the context of the present invention, the client device can preemptively identify WLAN/BT concurrent operation, and notify its server device such that the server can advantageously adjust operation accordingly.

Other common examples where a platform may expect to see less than optimal wireless performance include, for example: (i) variable physical configurations (e.g., "slider" or "clamshell" form factors, etc.), (ii) certain static form factor designs (e.g., ultra small or slim designs), (iii) physical device construction features (e.g., metallic component such as casings), and (iv) faster clocks and interfaces (e.g., Universal Serial Bus (USB) 3.0, Thunderbolt™, High Definition Multimedia Interface (HDMI), internal system memories and video memories), etc. Physical configurations and their impact on device operation are described in greater detail within co-owned and co-pending U.S. patent application Ser. No. 12/821,823 filed Jun. 23, 2010 and entitled "Methods and Apparatus for Dynamic Wireless Device Coexistence" which is incorporated herein by reference in its entirety.

In one aspect of the present invention, identification of the platform configuration is based on predetermined configuration information e.g., during manufacturer testing, design analysis, etc. For example, during initial product planning stages, a device may be designed to automatically flag impacted operation when multiple interfaces (e.g., WLAN and BT) are active. Similarly, certain form factors are known to have poor performance capabilities. For instance, a device that is intended for operation in a closed clamshell form factor may be additionally configured to automatically flag impacted operation for the radio interface. In still other examples, a device can be calibrated for optimal operation during device manufacture. Calibration processes may, inter alia, include determining the impact of various configurations on device performance. Once calibrated, the device can use the calibration data to determine when to flag impacted operation.

Moreover, it is further appreciated that the impact of the platform configuration may be dynamically determined at execution time (e.g., dynamically determined during an ongoing communication session, as an initialization step to a communication session, etc.). For example, consumers commonly purchase third-party protective sleeves for personal media devices; these sleeves can include metallic and/or shielding components which interfere with device reception. It is impractical to test the performance impact for the entire population of such protective sleeves; however, a mobile device can easily identify these effects at execution time.

Similarly, consumers may often download and execute third-party software applications which may have unpredictable effects on platform performance. However, a software program may determine that other applications are concurrently operating which affect the software program. Common schemes for determining possible platform performance conflicts include, inter alia: discovery services, firmware updates, and registry services. For example, a software program may access a registry, determine that a software conflict exists, and identify the impacted operation.

Alternately, the platform conditions can be monitored at execution time. For example, in one exemplary embodiment, the device monitors one or more antennas via indigenous hardware to determine the current noise floor. Such measurements can be performed for instance by setting the antenna's automatic gain control (AGC) to minimize clipping, and freely sampling the antenna results. The resulting waveform can be analyzed to determine ambient noise (e.g., spectral analysis, etc.), noise within a certain frequency band, unintended EMI leakage, etc.

In still other embodiments, the device may monitor other indicators of noise pollution; for example, a device may monitor processing burden (e.g., high processing burden can introduce significant levels of clock noise, etc.), power consumption (erratic power consumption can create non-linear behaviors in amplifiers and other components), etc.

At the conclusion of step 302 of the method 300, the client device has identified one or more impacted operations of the client device, based on the identified one or more platform configurations. Operations may be further refined to include for example impacted components that are expected to experience significant performance reduction. Such components may include for instance radio frequency transceivers, antennas, codecs, microphones, speakers, and/or displays. Alternately, the client device may identify specific applications which will be significantly impaired by the platform configuration. Common examples of such applications include data transfer, streaming data, multimedia playback, etc.

Still other schemes for identifying one or more platform configurations that affect operation of the client device will be recognized by those of ordinary skill in the related arts, given the disclosure herein, the foregoing being merely illustrative.

At step 304 of the method 300, the client device notifies a serving device (such as e.g., a Wi-Fi AP) of the one or more impacted operations. In one exemplary embodiment, the client device transmits a listing of one or more non-impacted operations. Alternately, the client device transmits a listing of one or more impacted operations. In still other embodiments, the client device can identify a configuration (rather than enumerate each capability individually), where the configuration is associated with certain capabilities that are predetermined (e.g., configuration mode A is associated with operational capabilities X, Y, Z, etc.).

In some systems, the client may be required to notify the serving device of its one or more impacted operations. For example, in one such embodiment, a client device that identifies a nearby WLAN server may attempt to register to the server. In the registration message (or a subsequent exchange thereafter), the client device further indicates its preferred configurations. In another embodiment, a client device that is connected to a server may periodically (or aperiodically) refresh its listing of configurations. Such refreshes may occur on a scheduled, intermittent or triggered basis (e.g., triggered responsive to a change in platform configuration or other event).

Alternatively, the client device notifies a serving device of the one or more impacted operations if/when requested. In one exemplary request scheme, a client device registers to a server; responsively, the server requests the available configurations supported by the client device before providing service. In some cases, the server initiates a request based on internal considerations (e.g., a lack of resources, etc.). Alternately, the server may initiate a request based on client information (e.g., where the client software version supports capabilities reporting, where the client performance has deteriorated, etc.).

In yet other cases, the client device itself determines when to notify the serving device of the one or more impacted operations. For example, the client may verify the server capabilities before providing a listing of impacted operations. In one such scheme, the client device discovers the server (e.g., via a beacon type broadcast). The server discovery mechanism includes a server identification. Based on the server identification (which may include e.g., software version, etc.), the client device determines that the server is capable of evaluating and allocating schemes based on a listing of configurations. Subsequently thereafter, the client device registers to the server, where the registration message includes a listing of its impacted operations.

As previously alluded to, in some embodiments of the invention, the client device can identify a configuration from a number of predefined options, rather than enumerate each capability explicitly. For example, consider a WLAN device that operates according to extant Modulation and Coding Schemes (MCS) implemented within IEEE 802.11n compliant devices (see TABLE 1, supra). The MCS schemes of TABLE 1 can be divided into modalities by the number of spatial streams; e.g., a first mode (MCS 0-7), a second mode (MCS 8-15), a third mode (MCS 16-23), and a fourth mode (MCS 24-31). Spatial stream modality may be useful where platform configurations greatly affects the operation of antennas individually.

Similarly, the MCS schemes of TABLE 1 can be divided into modalities by constellation: a first BPSK mode (MCS 0, 8, 16, 24), a second QPSK mode (MCS 1, 2, 9, 10, 17, 18, 25, 26), a third 16-QAM mode (MCS 3, 4, 11, 12, 19, 20, 27, 28), and a fourth 64-QAM mode (MCS 5, 6, 7, 13, 14, 15, 21, 22, 23, 29, 30, 31). Constellation-based modalities may be useful where platform configurations greatly affect the operation of all antennas.

Still other modality schemes may be used e.g., coding rate modalities, arbitrary modalities, etc. In fact, those of ordinary skill in the related arts will readily recognize, when given the present disclosure, that the foregoing approaches for categorizing MCS schemes are purely illustrative and are in no way limiting.

At step 306, the serving device determines a setting for the first interface, based at least in part on the client device notification, and communicates the setting to the client (e.g., via direct transmission of the setting to the client device). Alternatively, the client device may request the setting, such as via a periodic "pull" transaction, event-driven request, "ping" from the server, etc. For example, in some client-initiated embodiments, the client will monitor its use case and update the server to accommodate significant changes.

Once the setting is obtained, the client device configures itself in accordance therewith. It is of particular note that the server device in the exemplary embodiment does not necessarily base its decision entirely on the client device's notification. For example, the server device may override the client device's notification due to other limitations or considerations (e.g., network constraints, network congestion, etc.), or use the client notification as part of more complex decision-making logic.

More importantly, unlike prior art solutions, various implementations of the present invention allow a client device to indicate platform conditions to the server device. Prior art server solutions which adjusted performance were based only on channel performance; i.e., the server assumed that poor performance was necessarily due to the wireless channel itself. Thus, prior art servers adjusted performance without any knowledge of the client device platform (i.e., the prior art servers were "blind" to client device operation). In contrast, various implementations of the present invention enable the client device to inform the server of client platform configurations (whether with or without also using channel performance information). The informed server can therefore more effectively optimize performance in an intelligent manner.

In one exemplary embodiment, the server device comprises an intelligent optimization engine. The optimization engine may comprise for example a software algorithm executed on a processor, and/or dedicated hardware logic embodied within an application specific integrated circuit (ASIC), or other programmable logic. Common inputs to the optimization engine include for example: (i) the client device notification information, (ii) information for the current population of served client devices, (iii) network congestion data, (iv) historical performance data, and/or (v) monetary/profit considerations, (vi) channel conditions, etc. In one embodiment, the optimization engine receives one or more input parameters, assigns weights to each of the inputs, and calculates a weighted result for each possible setting that reflects the relative desirability of the setting. The setting that is the most desirable (e.g., having the highest calculated result) is the optimal setting for the client device.

For example, in one exemplary embodiment, a server having an optimization engine receives a listing of preferred MCS from a WLAN client device. For each of the preferred MCS settings, the optimization engine evaluates the relative benefits (e.g., increased data rate, etc.) to the relative costs (e.g., increased network congestion, increased error rates). The MCS setting with the best overall relative result is provided to the WLAN client device. In some cases, non-preferred MCS settings may additionally be evaluated using a weighted disincentive.

In other variants, the optimization engine may be configured according to a strict set of rules. Rules based optimization engines receive one or more input parameters, and evaluates the input parameters against a series of rules. Common examples of rules include, for example: IF-THEN conditional rules, and CAUSE-EVENT triggering rules. More specifically, rules may perform functions such as: selecting a setting based on the current network parameters, and modifying the setting responsive to changes in the network parameters. For example, in one such embodiment, the optimization engine may reference a pre-stored lookup table in the client; the client identifies and stores (or has been pre-configured with) its noise floor signatures; e.g., based on certain conditions, based on RSSI, PER, etc. Thereafter, during operation, the client can identify the optimal solution for switching from 3×3 to 2×2 to 1×1 MIMO operation.

The server may evaluate all settings, including settings which are contrary to the client device notification information. Such embodiments are both computationally more involved, and may select settings which are suboptimal for each client device. However, systems that evaluate all settings may provide better optimization in "corner cases" or from a more holistic network perspective (e.g., where multiple client devices have conflicting desires, etc.). Simpler server designs may evaluate only the subset of settings which are amenable to the specific client device under consideration. A myriad of different schemes for determining a setting for the client device will be recognized by those of ordinary skill given the present disclosure.

Once the client device receives the setting, the client device configures its first interface accordingly (step 308).

Example Operation—

Figure 4:
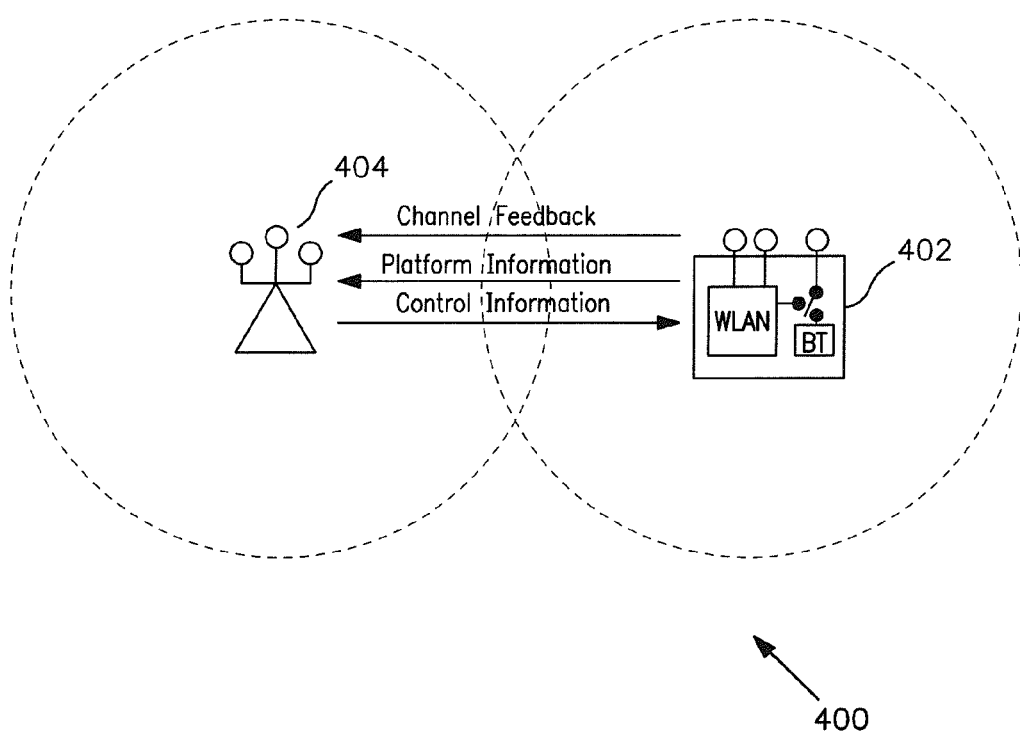
FIG. 4 is a graphical representation of an exemplary communication session in accordance with various aspects of the present invention.

Referring now to FIG. 4, one exemplary embodiment of a communication session 400 in accordance with various aspects of the present invention is disclosed. Here, the client device 402 and network entity (e.g., WLAN AP) 404 are in communication, and the client device is receiving data transmitted by the WLAN AP. However, unlike the prior art device of FIG. 2, the WLAN AP receives platform configuration information of the client device (in addition to, or in lieu of, channel information) to assist in its MCS decision. In one exemplary embodiment, the client device indicates an available subset of MCS, from the entire set of MCS. In some variants, the available subset may be further prioritized. The available subset of MCS is based at least in part on the known characteristics of the client device platform. Platform information may be influenced by, into cilia, physical configuration (e.g., location of antenna, and/or other EMI emitting components), neighboring component configuration (e.g., interoperation of other wireless components, such as a Bluetooth device, or other EMI emitting sources), co-executed software (e.g., contemporaneously executed software considerations, etc.), etc.

As shown in FIG. 4, the client device 402 includes a 3×3 WLAN and BT combination module, where the combination module "piggybacks" the BT interface with a WLAN antenna via a time-sharing antenna scheme. During operation, the client device determines its current platform configuration, and identifies a subset of MCS that are available (or in alternate variants, the client device may identify unavailable MCS), and provides the identified subset to the WLAN AP 404. For example, when the client device operates its WLAN transceiver at 2.4 GHz and the BT transceiver is active with a Synchronous Connection-Oriented (SCO) device, the client device recognizes that the shared antenna is greatly impacted. In this case, the BT SCO connection has higher priority than the WLAN transceiver; thus, the SCO will occupy ⅓ of the shared antenna time (i.e., 1.25 ms BT SCO out of every 3.75 ms). Rather than enabling the shared antenna for WLAN operation, the client device notifies the WLAN AP that the client only has MCS available that have 2×2 capability (instead of a full 3×3 system). For example, the client device indicates that only MCS0 through MCS15 of TABLE 1 are available.

Responsively, the WLAN AP selects a reasonable 2×2 MCS set, and the overall performance will remain acceptable. In this case, the WLAN AP selects MCS13, and the client device decodes received packets using its two (2) relatively clear antennas for 2×2 operation without problem. The shared antenna remains under BT control. Overall, the WLAN Packet Error Rate (PER) is lower, more stable and more reliable.

Figure 4A:
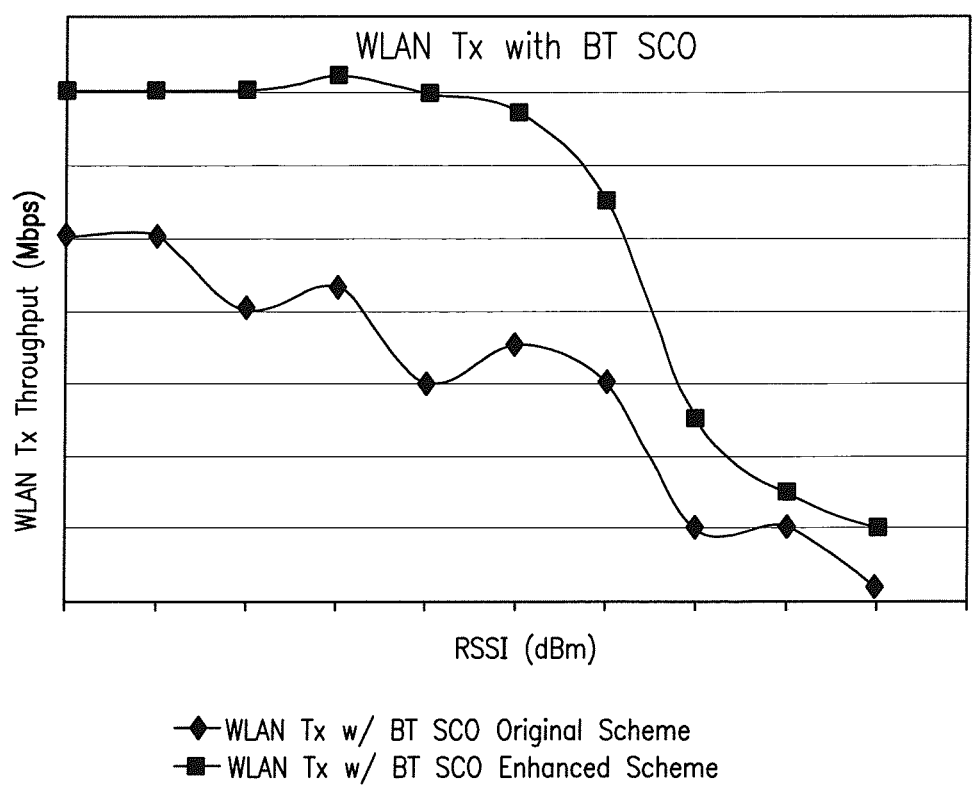
FIG. 4A is a graphical representation of the difference in transmit performance between a prior art solution and one exemplary solution in accordance with the present invention.
Figure 4B:
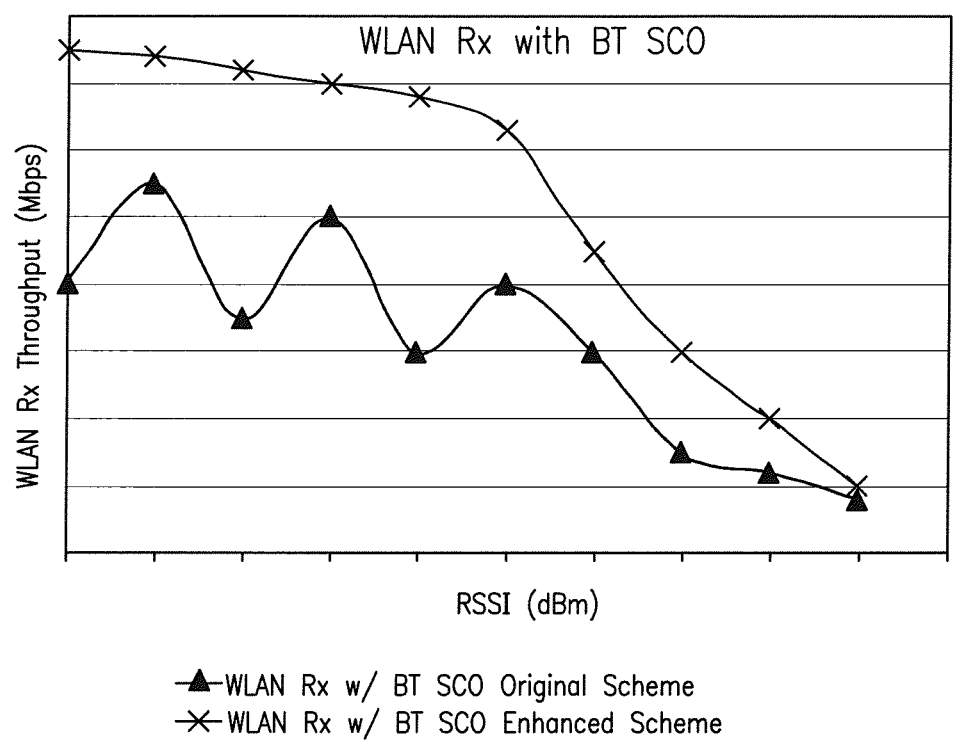
FIG. 4B is a graphical representation of the difference in receive performance between a prior art solution and one exemplary solution in accordance with the present invention.

FIG. 4A is a graphical representation of the performance difference in transmit operations between prior art solutions and one exemplary solution in accordance with the present invention. FIG. 4B is a graphical representation of the performance difference in receive operations between prior art solutions and one exemplary solution in accordance with the present invention.

Figure 5:
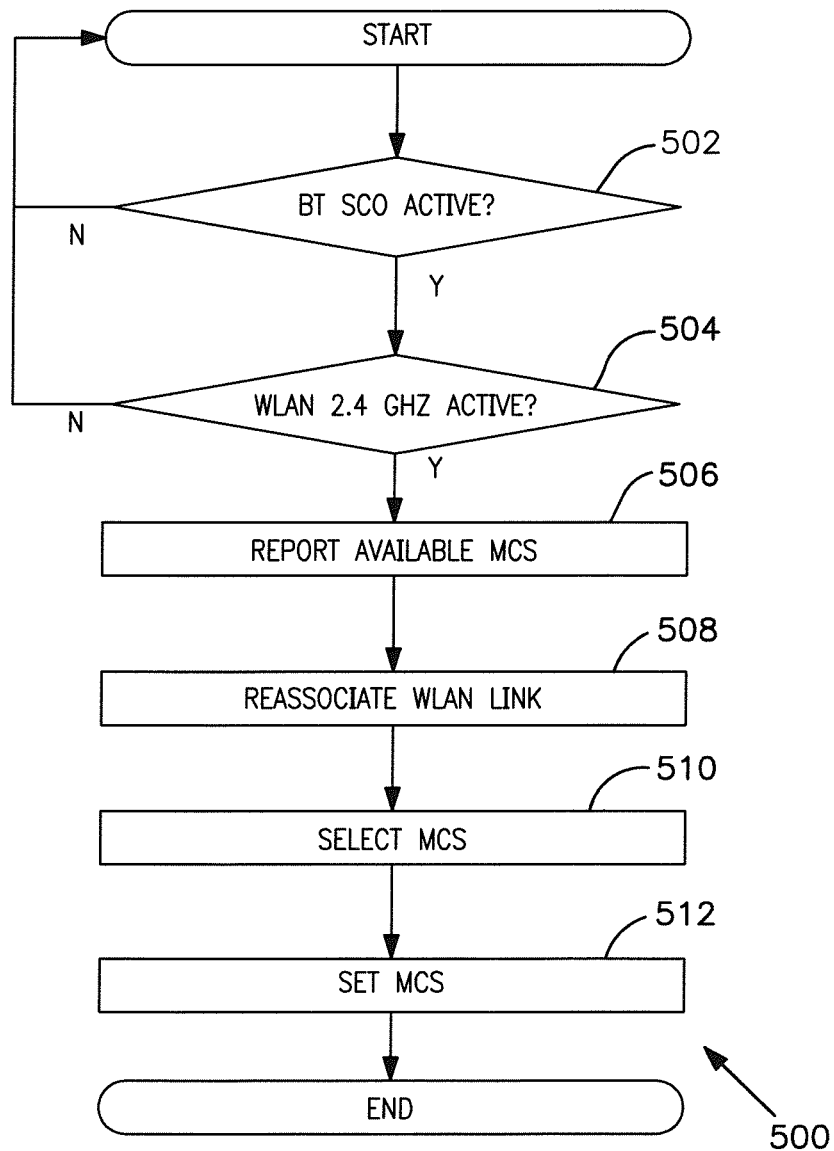
FIG. 5 is a logical flow diagram of one exemplary method for optimizing wireless network interfaces based on platform configuration.

FIG. 5 illustrates one exemplary embodiment of a method 500 for optimizing wireless network interfaces based on platform configuration. At step 502 of the method 500, the wireless device monitors to determine whether the BT module has SCO connected or not. If BT has an SCO connection, the device checks whether WLAN is also simultaneously operating at 2.4 GHz (with shared antenna capabilities) per step 504. If both conditions are true, then the wireless device will identify the available MCS schemes that are available without the shared antenna. Specifically, in one exemplary embodiment, the SCO connection is used to determine an appropriate MCS, which is reported to the server for adjustment. The wireless device can either request adjustment to MCS or in some cases, turn on or off entire transmit and receive chains, based on the monitored RSSI and noise floor level.

The wireless device may also monitor other platform configuration parameters. Common examples of such parameters include physical configuration, current component use, current resource utilization, ambient platform noise, peak platform noise, etc. In some cases, monitored conditions may comprise measurements performed over multiple locations of the device, time ranges, and/or frequency ranges. For example, in one embodiment, the noise measurements are monitored at each of the antennas of the device (described in greater detail hereinafter, see Exemplary Antenna Noise Monitoring). Antennas that are particularly noisy (for whatever reason) may also be removed from the available MCS schemes.

At step 506, the wireless device reports the determined available MCS set to the WLAN AP. In one exemplary embodiment, a listing of available MCS is reported. The MCS sets may be further grouped according to certain distinguishing qualities; for example, rather than enumerating each available/unavailable MCS, the client device may instead indicate that only one (1) and two (2) antenna MCS configurations can be used (or alternately, three (3) and four (4) antenna configurations cannot be used).

The wireless device provides platform configuration updates to the WLAN AP whenever the platform configuration changes. In this example, the wireless device updates the WLAN AP when BT SCO is active or inactive.

At step 508, responsive to receiving the notification of available/unavailable MCS, the WLAN AP and client re-associate. In one exemplary embodiment, the WLAN AP and client device can execute a re-association without disconnecting (i.e., existing and ongoing connections can continue without interruption). During re-association, the WLAN AP updates its configuration for the client device. For example, the WLAN AP may update an internal database, where the internal database stores current configuration information and limitations for each of the served devices. The internal database may also store historical data or even predictive/speculative data.

At step 510, the WLAN AP selects a MCS configuration for subsequent transmissions, based at least in part on the available/unavailable MCS information. Generally, the WLAN AP selects the optimal MCS from the subset of available MCS, for the current data transmission application. Moreover, in some embodiments the WLAN AP may additionally consider its internal constraints, and/or other known network constraints. For example, the WLAN AP may have analogous platform constraints which further limit the available MCS set, or alternately, the WLAN AP may override device considerations, and adjust its behaviors to accept higher error rates.

At step 512, the client device receives the selected MCS configuration, and adjusts itself accordingly.

More generally, since existing solutions do not take the client device's platform design into consideration, the performance can be heavily compromised (as described supra e.g., due to WLAN/BT time sharing, etc.). Accordingly, the various aspects of the exemplary embodiment of the present invention provide for a scheme whereby the client device can selectively limit the AP's MCS selection based on the current platform configuration, thereby avoiding configurations which are likely to be heavily impacted.

It will also be recognized that some or all of the functionality associated with the "server" or network side of the scenarios above may be delegated or offloaded from the AP, such as to another connected network entity, with the AP merely being a pass-through or gateway from a logical perspective. In some variants there may not be any requirement for a server at all, the following methods and apparatus are equally well suited to more other network infrastructures (e.g., in peer-to-peer networks such as wireless file transfers (airdrop) and/or ad hoc WLAN (ADWL))

Exemplary Antenna Noise Monitoring—

Figure 6:
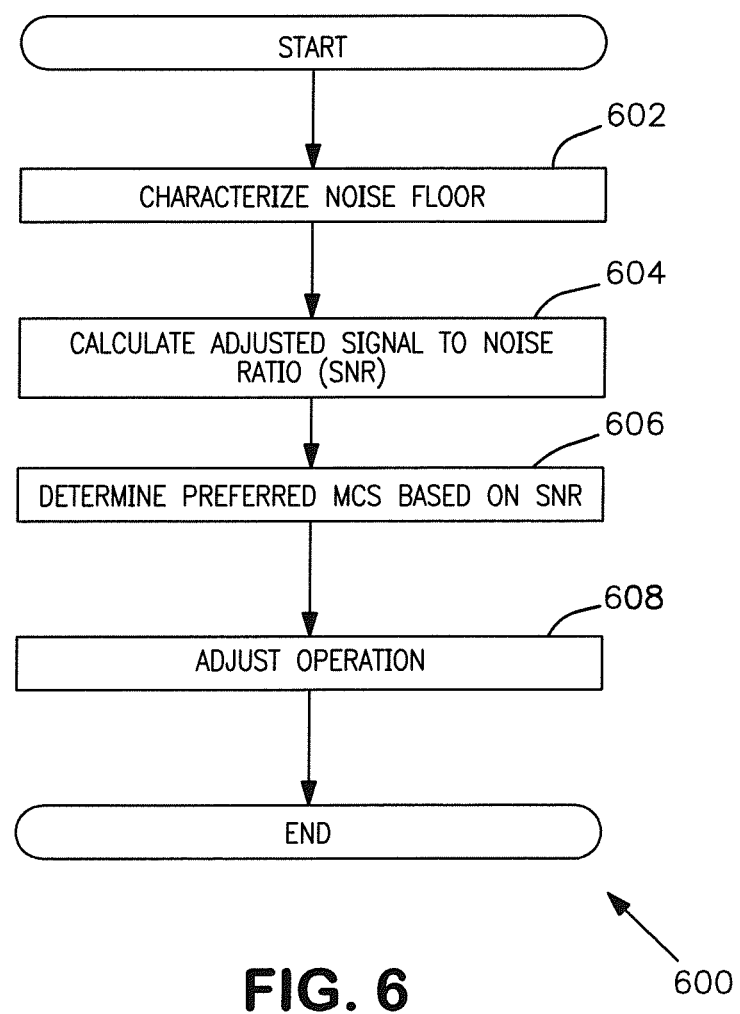
FIG. 6 is a logical flow diagram illustrating one exemplary embodiment of a method of antenna monitoring performed at a client device in accordance with the invention.

Referring now to FIG. 6, one exemplary embodiment of a method of antenna monitoring 600 in accordance with the present invention is shown. Specifically, a client device monitors each of its antennas to determine if the noise floor of the current platform configuration will significantly impact radio operation. As a brief aside, in compact form factor MIMO (Multiple Input Multiple Output) antenna designs, the noise floor for each of the antennas may be impacted to greater or lesser degrees. For instance, in a 3×3 WLAN client device, the noise floor for each antenna is affected by proximity to system components that emit high levels of electromagnetic interference (EMI); these "noisy" components include, but are not limited to: memory, display cables, hard disk drives (HDD), high speed data ports, other nearby antennas, etc.

A brief discussion of antenna noise calculations is useful for the subsequent discussion of FIG. 6 herein. As is well known in the prior art, signal transmissions are greatly attenuated by transmission over the wireless medium. For example, the expected path loss for a WLAN wireless link is given by EQN. 1:

$$P_r(\text{dBm}) = P_t(\text{dBm}) + G_t(\text{dB}) + G_r(\text{dB}) + 20\log(\lambda/4\pi) + 10n\log(1/d) \qquad \text{EQN. 1:}$$

Where:
$P_r$ is the received signal power;
$P_t$ is the transmitted signal power;
$G_r$ is the gain for the receiver antennas;
$G_t$ is the gain for the transmitter antennas;
$\lambda$ is the wavelength of the transmit frequency; and
n is the index for environment.

However, in addition to path loss, other types of signal degradation may have significant impacts. For example, thermal noise is an unavoidable noise caused by the ambient temperature of the operating environment. Typically, thermal noise is expressed in units of spectral power density (dBm/Hz). Unfortunately, larger bandwidths experience larger thermal noise power. Referring now to EQN. 2:

$$P_{th}(\text{dBm}) = -174 \text{ dBm/Hz} + 10\log(\text{bandwidth}) \qquad \text{EQN. 2:}$$

Where:
$P_{th}$ is the total thermal noise; and
bandwidth is the transmit bandwidth.

For example, a 1 Hz transmission bandwidth at the room temperature will experience a thermal noise of $P_{th}=kTB=-174$ dBm/Hz. TABLE 2 provides a representative sampling of thermal noise floor, as a function of transmit bandwidth.

TABLE 2

| Thermal Noise Floor (−dBm) | Bandwidth |
|---|---|
| −174 | 1 Hz |
| −124 | 100 KHz |
| −114 | 1 MHz |
| −104 | 10 MHz |
| −101 | 20 MHz |
| −98 | 40 MHz |

Finally, if the receiver is perfect, the total noise contributed by the receiver would be equal to the thermal noise floor. However in all practical implementations, the receiver adds noise. Traditionally, the platform noise contributed by the receiver is defined as a noise figure, where the noise figure is calculated as: the signal to noise ratio at the output divided by the signal to noise ratio at the input (a simple ratio). The noise figure is commonly expressed in dB, and can be easily measured with a spectrum or noise figure meter.

The total amount of receiver noise, (the receiver noise floor ($P_n$)) can be calculated with EQN. 3:

$$P_n = -174 \text{ dBm} + 10\log(\text{bandwidth}) + NF(\text{dB}) \qquad \text{EQN. 3:}$$

Where:
$P_n$ is the total amount of receiver noise;
bandwidth is the transmit bandwidth; and
NF is the noise figure.

Consider a typical IEEE 802.11 a/g receiver having a receiver bandwidth of 16.7 MHz, and a noise figure of 5 dB; the receiver would have a total noise floor of approximately −97 dBm (−174 dBm+10 log(bandwidth)+5 dB≈−174 dBm+10 log(16.7 MHz)+−97 dBm).

Typical MIMO antenna systems generally assume that momentary loss over one of the antennas will not affect the other antennas. However, where the noise floor for the antennas is not the same, marginal behavior on the antennas can severely impact performance. Consider a first antenna having a noise floor of approximately −95 dBm at 20 MHz, and a second antenna that has a noise floor of −85 dBm at 20 MHz. TABLE 3 illustrates an experimentally determined relationship between noise and effective range of the antenna, for the foregoing scenario.

TABLE 3

| Platform Noise Impact (level above thermal noise floor) | Operating Range Reduction (Indoor) n = 3.3 | 892.11a/b/g/n Indoor Range | Operation Range Reduction (Outdoor) n = 2 | 802.11a/b/g/n Outdoor Range |
|---|---|---|---|---|
| 0 dB | 0% | 100 m | 0% | 300 m |
| 3 dB | 13% | 87 m | 21% | 237 m |
| 5 dB | 30% | 70 m | 44% | 168 m |
| 10 dB | 50% | 50 m | 69% | 94 m |

As shown in TABLE 3, the 10 dB difference between the first and second radio frequency (RF) transmit and receive logic (also commonly referred to as an RF "chain") reduces the effective distance of the antenna by half in indoor environments, and nearly 70% in outdoor use scenarios.

Prior art IEEE 802.11 a/g systems handle rate adaptation at the access point (AP), based on the client device's RSSI and PER. However, prior art APs do not have any information as to the client device's Noise Floor (NF). In particular, prior art APs assume that any noise is related to the wireless channel, and not the client device's NF (e.g., an NF imbalance across multiple antennas, momentary noise, etc.). Accordingly, prior art APs may blindly adjust the modulation and coding scheme (MCS), which can severely impact the data rate or range.

Referring back to FIG. 6, at step 602, the client device noise floor is characterized. For example, in one exemplary embodiment, the client device platform noise is measured on a per-chain, per-channel, and/or per-use case basis, etc. and stored within the device for use. This characterization can be performed during the manufacture of the client device, by third-party service technicians, and/or by the device itself at execution time.

At step 604 of the method 600, during execution time, the client device measures the RSSI, retrieves the NF estimates, and calculates an adjusted Signal to Noise Ratio (SNR). In one such embodiment, the RSSI is measured on a per chain basis, and the NF estimates are based on the current use case. It is of note that RSSI measurements can always be performed (even during idle mode); however, in embodiments where packet error rate (PER) or bit error rate (BER) is available, these other criteria may be used.

At step 606, the client device determines an appropriate MCS based on the SNR, and notifies the server device. At step 608, responsive to receiving an MCS assignment from the server, the client adjusts its operation according to the MCS assignment, where the MCS assignment is configured to compensate for platform use case and/or configuration.

Figure 7:
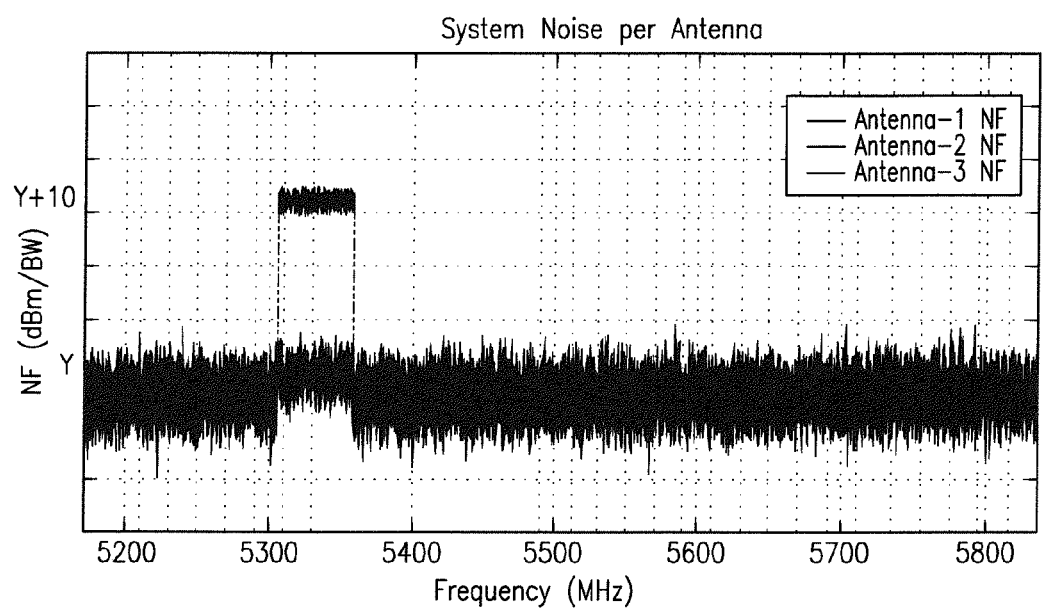
FIG. 7 is a graph illustrating one possible noise floor measurement (as a function of receive chain and frequency) according to the method of FIG. 6.
Figure 8:
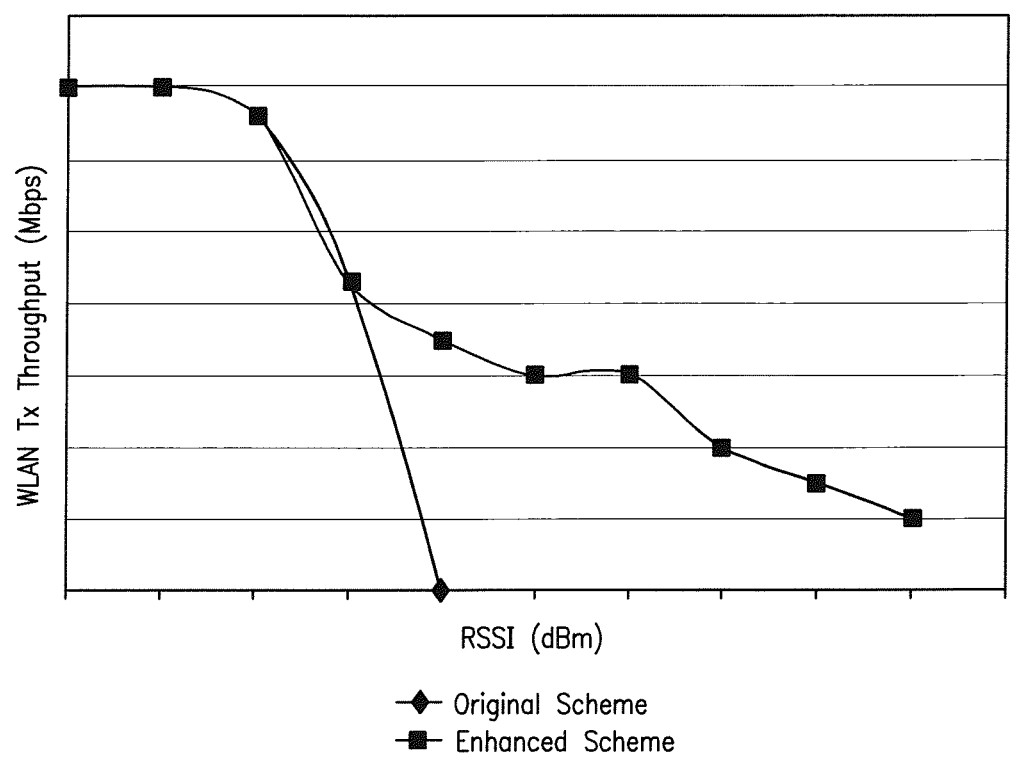
FIG. 8 is a graphical representation of the difference in transmission throughput between a prior art solution and the exemplary method of FIG. 6.

FIG. 7 illustrates one possible NF measurement as a function of receive chain and frequency. Most notably, antenna 2 has a significant interferer within a frequency band (5.3 GHz, to 5.35 GHz) that is significantly higher than antennas 1 and 3. In this exemplary scenario, the client device recognizes that antenna 2 has a very high NF (and correspondingly low SNR); the client device reports back that only MCS of 2×2 or 1×1 operation are suitable for use. The server adjusts the MCS accordingly, so as to support a lower but still acceptable data rate. FIG. 8 graphically illustrates the performance based on traditional WLAN operation (where WLAN range is heavily degraded due to uneven NF across multiple antennas) and performance based on the enhanced scheme of FIG. 6. As shown in FIG. 8, rather than sharply degrading as RSSI increases, the supported MCS can support a lower order MCS, but maintain reasonable performance.

As previously noted, existing solutions adapt to current link conditions by enabling/disabling antennas under the assumption that all chains have the same quality (e.g., comparable levels of noise, etc.). However, antenna location and/or design will vary in all practical implementations, and corresponding levels of isolation and noise will differ between antennas. Since existing solutions rely on antenna agnostic information (e.g., RSSI and PER), significant performance gains can be made by adjusting MCS selection to compensate for actual antenna performance. Moreover, since SNR is more critical than RSSI alone, a client device can significantly improve performance by calculating SNR based on both RSSI and NF (e.g., per antenna, per channel, per use case, etc.).

Exemplary Client Apparatus—

Figure 9:
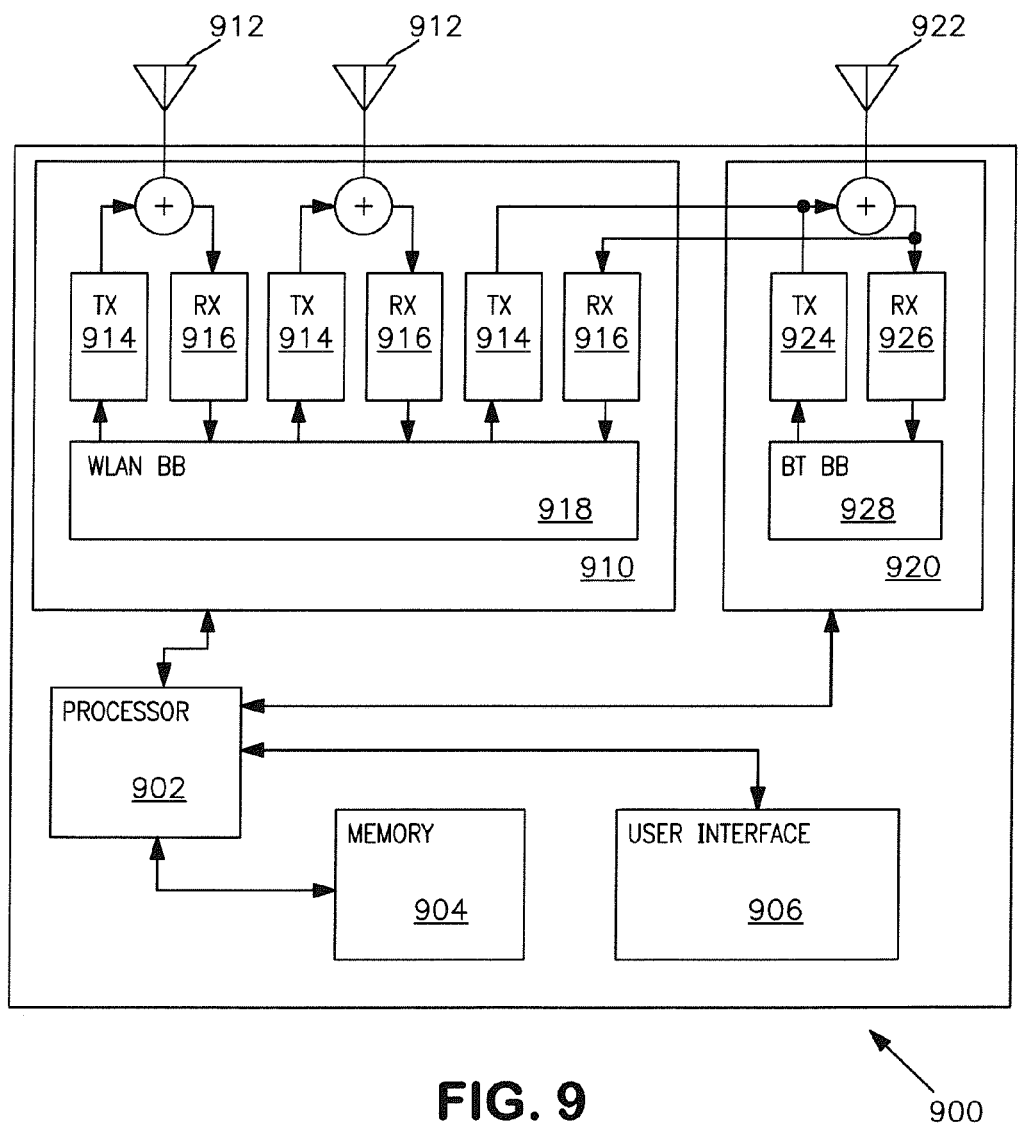
FIG. 9 is a functional block diagram of one embodiment of a client device configured in accordance with the present invention.

Referring now to FIG. 9, an exemplary apparatus 900 configured to optimize wireless network operation based on platform configuration is shown and described in detail. The exemplary apparatus of FIG. 9 is a wireless device with a processor subsystem 902 such as a digital signal processor, microprocessor, field-programmable gate array, or plurality of processing components mounted on one or more substrates. The processing subsystem is connected to a computer-readable media subsystem 904 comprising memory which may for example, include RAM, SRAM, flash, SDRAM, etc. components. The memory subsystem contains computer-executable instructions which are executable by the processor subsystem.

The user interface subsystem 906 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

The apparatus 900 of FIG. 9 additionally comprises a WLAN module 910 and associated WLAN antennas 912 and a Bluetooth (BT) module 920 and associated BT antenna 922 that is substantially co-located with one another, thereby introducing some level of RF interference as a result of less-than-optimal antenna isolation. In one exemplary embodiment, at least one antenna 922 is shared between the WLAN and BT modules.

It will be appreciated that while described in the exemplary context of Bluetooth interfaces and Wireless Local Area Network (WLAN) interfaces, the apparatus 900 of FIG. 9 is in no way so limited. In fact, various aspects of the present invention are broadly applicable to any wireless interface, including without limitation, cellular networks, satellite and terrestrial networks, ad hoc peer-to-peer networks, Metropolitan Area Networks (MAN), Personal Area Networks (PAN), etc.

Referring now to the WLAN module 910 and WLAN antenna 912; the WLAN module generally comprises a number of transmit 914 and receive chains 916. Each transmit and receive chain may share an antenna 912 (as shown), or may each have their own antenna. The WLAN multi-antenna array is managed by the WLAN baseband 918.

In one exemplary embodiment, the apparatus 900 is configured to receive one or more parameters to modify the behavior of the WLAN interface. The modified behavior of the WLAN interface may include for example: the number of active spatial streams or antennas, modulation, coding rate, channel bandwidth, etc. In one common variant, the one or more parameters comprises a modulation and coding scheme (MCS) index.

Similarly, the BT module 920 and shared WLAN/BT antenna 922; generally comprises a number of transmit 924 and receive chains 926. The BT antenna array is managed by the BT baseband 928.

Furthermore, as shown, the shared antenna 922 can be accessed by both the WLAN and BT interfaces. In one exemplary embodiment, the at least one shared antenna is further configured to switch between the WLAN and BT interfaces. In one exemplary embodiment, the BT interface is further classified as a Synchronous Connection-Oriented (SCO) device which has a higher priority than the WLAN interface. During normal operation, the shared antenna can be operated according to a time sharing scheme. For example, the BT interface receives one third (1.25 ms out of every 3.75 ms) of the total antenna time, the WLAN interface receives the remaining two thirds of time (2.5 ms out of every 3.75 ms).

While the exemplary apparatus 900 of FIG. 9 has three (3) WLAN antennas, one of which is shared with the BT interface. It is readily appreciated by those of ordinary skill that both higher and lower order antenna arrays (e.g., one (1), two (2), four (4), five (5), etc.) may be used consistent with the invention.

In one aspect of the present invention, the apparatus 900 is configured to identify one or more impacted operations based on platform configuration. In the exemplary embodiment, the apparatus 900 is configured to identify when the shared antenna performance will be significantly impacted by concurrent operation of the WLAN and BT interfaces. The apparatus 900 is further configured to prevent or mitigate the impending (or ongoing) impact by providing appropriate notification to a server device. In one exemplary embodiment, the apparatus 900 is configured to communicate a preferred (or non-preferred) listing of modulation and coding schemes (MCS) to a server. Responsively, the server can adjust the MCS so as to best optimize performance for the apparatus' current platform configuration.

Exemplary Server Apparatus—

Figure 10:
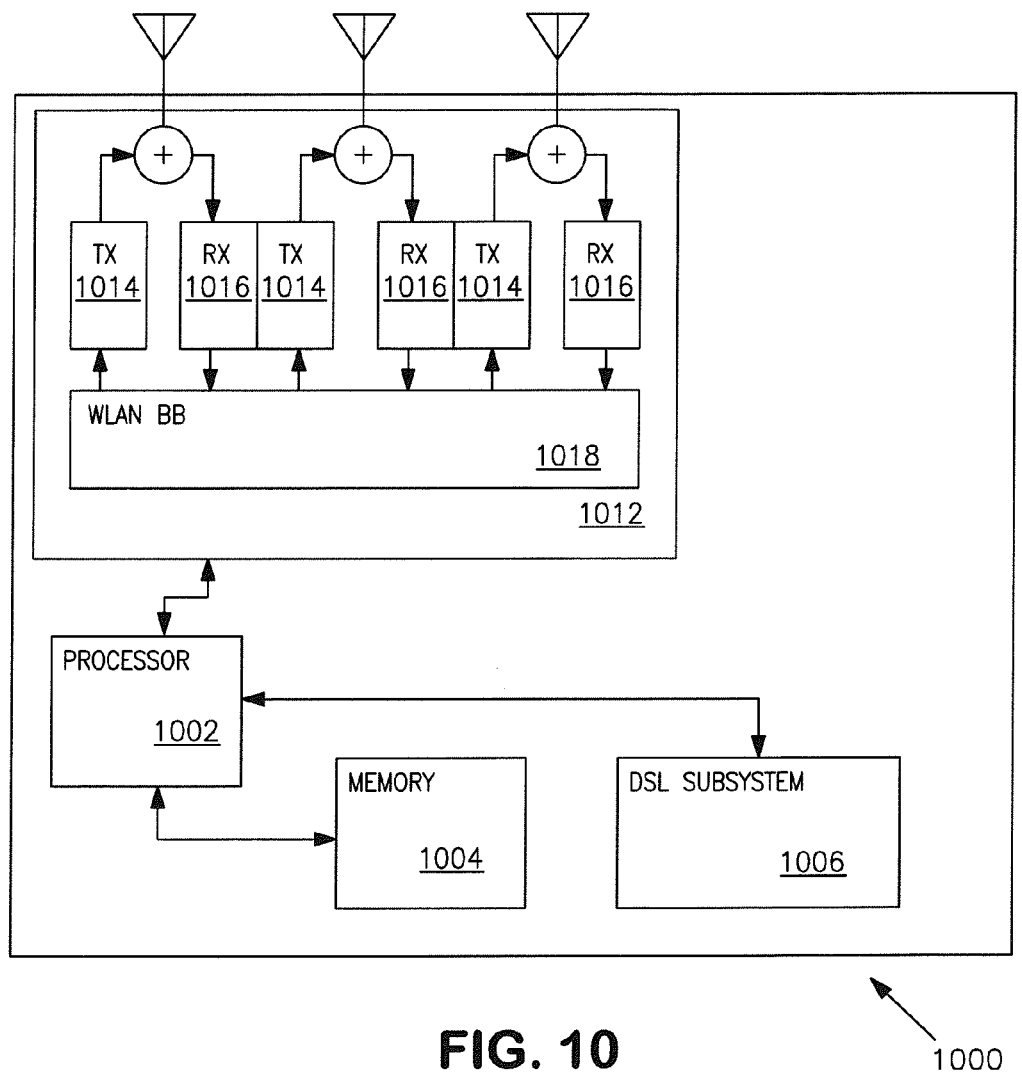
FIG. 10 is a functional block diagram of one embodiment of a server configured in accordance with the present invention.

Referring now to FIG. 10, exemplary server apparatus 1000 useful in implementing the functionality previously described above is illustrated and described. The server apparatus 1000 of the illustrated embodiment generally takes the form factor of a stand-alone device for use in a premises, although other form-factors (e.g., base stations, ad hoc clients, etc.) are envisaged as well. The apparatus of FIG. 10 includes one or more substrate(s) that further include a plurality of integrated circuits including a processing subsystem 1002 such as a digital signal processor (DSP), microprocessor, PLD or gate array, or plurality of processing components, RF transceiver(s), as well as a power management subsystem that provides power to the server 1000.

The processing subsystem 1002 includes in one embodiment a digital signal processor, microprocessor, field-programmable gate array, or plurality of processing components mounted on one or more substrates. The processing subsystem is connected to a computer-readable media subsystem 1004 comprising memory which may for example, include RAM, SRAM, flash, SDRAM, etc. components. The memory subsystem contains computer-executable instructions which are executable by the processor subsystem.

The exemplary apparatus 1000 will, in some embodiments, implement some form of broadband access. In the illustrated embodiment, the broadband access is provided by a DSL connection (i.e., via DSL subsystem 1006), although other interfaces, whether wired or wireless, may be used in place of or in combination with the DSL subsystem shown. The digital portion of DSL processing may either be performed in the processor, or alternatively in a separate DSL processor (not shown). Further, while a DSL broadband connection is illustrated, it is recognized by one of ordinary skill that other broadband access schemes such as DOCSIS cable modem, T1 line, WiMAX (i.e., IEEE Std. 802.16), ISDN, FiOS, microwave link, satellite link, etc. could be readily substituted or even used in tandem with the aforementioned DSL interface. DSL has the advantage of being low cost and generally ubiquitous, and carried over copper-based telephony infrastructure which is currently widely distributed throughout the population.

Referring now to the WLAN module 1012 and WLAN antennas; the WLAN module generally comprises a number of transmit 1014 and receive chains 1016. Each transmit and receive chain may share an antenna (as shown), or may each have their own antenna. The WLAN multi-antenna array is managed by the WLAN baseband 1018.

In one exemplary embodiment, the apparatus 1000 is configured to transmit one or more parameters that specify the behavior of the WLAN network interface. The server controls the operation of the WLAN network interface, including for example: the number of active spatial streams or antennas, modulation, coding rate, channel bandwidth, etc.

In one aspect of the present invention, the apparatus 1000 is configured to adjust the WLAN network interface to compensate for platform configuration issues identified by a client device. In the exemplary embodiment, the client device provides notification to a server device, the notification comprising one or more indications as to appropriate WLAN network interface settings based on the client device's platform configuration. In one exemplary embodiment, the server 1000 is configured to select a MCS from a subset of preferred modulation and coding schemes (MCS).

In one exemplary embodiment, the server device comprises an intelligent optimization engine. The optimization engine may comprise for example a software algorithm executed on the processor subsystem 1002. The optimization algorithm considers, for example: the client device notification information, information for the current population of served client devices, network congestion data, historical performance data, monetary and profit considerations, etc. In one embodiment, the optimization engine is configured to receive one or more input parameters, assign weights to each of the inputs, and calculate a weighted result for each possible setting that reflects the relative desirability of the setting. The setting that is the most desirable (having the highest calculated result) is the optimal setting for the client device.

In other common variants, the optimization engine may based on one or more rules. Rules based optimization engines are configured to receive one or more input parameters, and evaluate the input parameters against the one or more rules.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for optimizing wireless network performance, the method comprising:
   identifying a platform configuration that impacts one or more operations of a client device comprising a Wireless Local Area Network (WLAN) interface and a Bluetooth (BT) interface, the WLAN interface and BT interface having at least one shared antenna, the platform configuration configured to enable concurrent operation of the WLAN and BT interfaces;
   notifying a serving device of the platform configuration, where responsive to notification the serving device selects an appropriate setting, the notifying the serving device of the platform configuration further comprises indicating one or more modulation and coding schemes (MCS) which exclude the at least one shared antenna; and
   configuring the client device according to the selected appropriate setting.

2. The method of claim 1, where the notifying the serving device of the platform configuration further comprises transmitting a message, the message comprising a listing of one or more preferred settings.

3. The method of claim 2, where the listing of one or more preferred settings comprises a listing of the one or more MCS.

4. The method of claim 1, where the notifying the serving device of the platform configuration further comprises transmitting a message, the message comprising a listing of one or more settings that are not preferred.

5. The method of claim 1, wherein the notifying of the serving device is in response to a request from the serving device.

6. The method of claim 1, wherein the BT interface has an active connection with a Synchronous Connection-Oriented (SCO) device.

7. The method of claim 6, wherein the one or more MCS is determined based on the active SCO connection.

8. The method of claim 1, wherein the identifying further comprises monitoring a received signal strength index (RSSI) and a noise floor of one or more antennas of the client device.

9. A client device configured to assist in optimizing wireless network perfounance, the client device comprising:
- a first interface configured to operate within a first wireless network according to a setting, the first wireless network comprising a Wireless Local Area Network (WLAN);
- a second interface configured to operate within a second wireless network according to a second setting, the second wireless network comprising a Bluetooth (BT) network, the first interface and the second interface having at least one shared antenna;
- a processor; and
- a computer readable medium, the computer readable medium comprising instructions which when executed by the processor, causes the client device to:
  - identify a platform configuration that impacts one or more operations of the client device, where the platform configuration comprises concurrent operation of the first interface and the second interface;
  - notify a serving device of the platform configuration, where responsive to a notification, the serving device selects an appropriate setting, the notification comprising an indication of one or more modulation and coding schemes (MCS) which exclude the at least one shared antenna; and
  - configure the first interface according to the selected appropriate setting.

10. The client device of claim 9, where concurrent operation of the first and second wireless interface affect operation of at least the first wireless interface.

11. The client device of claim 9, where the first interface comprises a plurality of antennas, at least one of the antennas being shared with the second interface.

12. The client device of claim 9, further comprising instructions which when executed by the processor:
- monitor one or more platform configurations; and
- determine one or more preferred settings based at least in part on the one or more impacted operations.

13. The client device of claim 12, wherein the one or more preferred settings comprises at least a modulation scheme.

14. The client device of claim 12, wherein the one or more preferred settings comprises at least a coding scheme.

15. The client device of claim 9, further comprising instructions which when executed by the processor re-associate the client device with the serving device.

16. The client device of claim 15, wherein the client device and the serving device re-associate without interruption of ongoing connections.

17. A server device configured to optimize wireless network performance based on client device platform information, the server device comprising:
- a first interface configured to serve a first wireless network, where the first interface comprises a Wireless Local Area Network (WLAN) interface;
- a processor; and
- a computer readable medium, the computer readable medium comprising instructions which when executed by the processor, cause the server device to:
  - receive a platform configuration information from at least one client device, the at least one client device configured with the WLAN interface and a Bluetooth (BT) interface, the WLAN and BT interfaces having at least one shared antenna, the platform configuration information configured to indicate one or more modulation and coding schemes (MCS) which the at least one client device can support without concurrent operation of the at least one shared antenna;
  - select an appropriate setting based at least in part on the received platform configuration information; and
  - configure the first wireless network according to the selected appropriate setting.

18. The server device of claim 17, further comprising instructions which when executed by the processor update an internal database with the platform configuration information, where the internal database comprises platform configuration information associated with a plurality of client devices.

19. The server device of claim 17, wherein the selection of the appropriate setting comprises evaluation of each of the one or more MCS based on historical performance data.

20. The server device of claim 18, where the one or more MCS comprise a listing of preferred MCS from the at least one client device.

* * * * *

UNITED STATES PATENT AND TRADEMARK OFFICE
CERTIFICATE OF CORRECTION

PATENT NO. : 8,995,929 B2
APPLICATION NO. : 13/312894
DATED : March 31, 2015
INVENTOR(S) : Camille Chen et al.

It is certified that error appears in the above-identified patent and that said Letters Patent is hereby corrected as shown below:

In the Specification
Column 3: (lines 43-54)
Currently read:
"In a third embodiment, a server device configured to optimize wireless network performance based on client device platform information is disclosed. In one exemplary embodiment, the server device comprises: a first interface configured to serve a first wireless network; a processor; a computer readable medium, the computer readable medium comprising instructions which when executed by the processor: receive a platform configuration information from at least one client device; select an appropriate setting based at least in part on the received platform configuration information; and configure the first wireless network according to the selected appropriate setting."

Should Read:

-- In a third aspect, a server device configured to optimize wireless network performance based on client device platform information is disclosed. In one exemplary embodiment, the server device comprises: a first interface configured to serve a first wireless network; a processor; a computer readable medium, the computer readable medium comprising instructions which when executed by the processor: receive a platform configuration information from at least one client device; select an appropriate setting based at least in part on the received platform configuration information; and configure the first wireless network according to the selected appropriate setting. --

Column 9: (lines 6-21)
Currently read:
"Other common examples where a platform may expect to see less than optimal wireless performance include, for example: (i) variable physical configurations (e.g., "slider" or "clamshell" form factors, etc.), (ii) certain static form factor designs (e.g., ultra small or slim designs), (iii) physical device construction features (e.g., metallic component such as casings), and (iv) faster clocks and interfaces (e.g., Universal Serial Bus (USB) 3.0, Thunderbolt.TM., High Definition Multimedia Interface (HDMI), internal system memories and video memories), etc. Physical configurations and their impact Signed and Sealed this
Twenty-ninth Day of September, 2015

Michelle K. Lee
*Director of the United States Patent and Trademark Office* on device operation are described in greater detail within co-owned and co-pending U.S. patent application Ser. No. 12/821,823 filed Jun. 23, 2010 and entitled "Methods and Apparatus for Dynamic Wireless Device Coexistence" which is incorporated herein by reference in its entirety."

Should Read:

-- Other common examples where a platform may expect to see less than optimal wireless performance include, for example: (i) variable physical configurations (e.g., "slider" or "clamshell" form factors, etc.), (ii) certain static form factor designs (e.g., ultra small or slim designs), (iii) physical device construction features (e.g., metallic component such as casings), and (iv) faster clocks and interfaces (e.g., Universal Serial Bus (USB) 3.0, Thunderbolt.TM., High Definition Multimedia Interface (HDMI), internal system memories and video memories), etc. Physical configurations and their impact on device operation are described in greater detail within co-owned U.S. patent application Ser. No. 12/821,823 filed Jun. 23, 2010 and entitled "Methods and Apparatus for Dynamic Wireless Device Coexistence", now US Patent No. 8,693,569, which is incorporated herein by reference in its entirety. --

In the Claims

Column 21 (claim 9) line 4:
Currently reads:
"9. A client device configured to assist in optimizing wireless network perfounance, the client device comprising:
a first interface configured to operate within a first wireless network according to a setting, the first wireless network comprising a Wireless Local Area Network (WLAN); a second interface configured to operate within a second wireless network according to a second setting, the second wireless network comprising a Bluetooth (BT) network, the first interface and the second interface having at least one shared antenna;
a processor; and
a computer readable medium, the computer readable medium comprising instructions which when executed by the processor, causes the client device to:
identify a platform configuration that impacts one or more operations of the client device, where the platform configuration comprises concurrent operation of the first interface and the second interface;
notify a serving device of the platform configuration, where responsive to a notification, the serving device selects an appropriate setting, the notification comprising an indication of one or more modulation and coding schemes (MCS) which exclude the at least one shared antenna; and
configure the first interface according to the selected appropriate setting."

Should Read:

-- 9. A client device configured to assist in optimizing wireless network performance, the client device comprising:
a first interface configured to operate within a first wireless network according to a setting, the first wireless network comprising a Wireless Local Area Network (WLAN); a second interface configured

CERTIFICATE OF CORRECTION (continued)
U.S. Pat. No. 8,995,929 B2 to operate within a second wireless network according to a second setting, the second wireless network comprising a Bluetooth (BT) network, the first interface and the second interface having at least one shared antenna;

a processor; and a computer readable medium, the computer readable medium comprising instructions which when executed by the processor, cause the client device to:

identify a platform configuration that impacts one or more operations of the client device, where the platform configuration comprises concurrent operation of the first interface and the second interface;

notify a serving device of the platform configuration, where responsive to a notification, the serving device selects an appropriate setting, the notification comprising an indication of one or more modulation and coding schemes (MCS) which exclude the at least one shared antenna; and configure the first interface according to the selected appropriate setting. --

Column 21 (claim 10) line 30:
Currently reads:
"10. The client device of claim 9, where concurrent operation of the first and second wireless interface affect operation of at least the first wireless interface."

Should Read:

-- 10. The client device of claim 9, where concurrent operation of the first and second wireless interfaces affect operation of at least the first wireless interface. --

Column 22 (claim 20) line 40:
Currently reads:
"20. The server device of claim 18, where the one or more MCS comprise a listing of preferred MCS from the at least one client device."

Should Read:

-- 20. The server device of claim 17, where the one or more MCS comprise a listing of preferred MCS from the at least one client device. --